United States Patent
McMain

(10) Patent No.: US 8,262,474 B2
(45) Date of Patent: Sep. 11, 2012

(54) METHOD AND DEVICE FOR CONTROLLING PLAYER CHARACTER DIALOG IN A VIDEO GAME LOCATED ON A COMPUTER-READABLE STORAGE MEDIUM

(76) Inventor: Michael Parker McMain, Cumming, GA (US)

( * ) Notice: Subject to any disclaimer, the term of this patent is extended or adjusted under 35 U.S.C. 154(b) by 53 days.

(21) Appl. No.: 12/780,900

(22) Filed: May 16, 2010

(65) Prior Publication Data

US 2010/0267450 A1   Oct. 21, 2010

Related U.S. Application Data

(63) Continuation-in-part of application No. 12/764,739, filed on Apr. 21, 2010, now abandoned.

(60) Provisional application No. 61/179,429, filed on May 19, 2009, provisional application No. 61/171,456, filed on Apr. 21, 2009.

(51) Int. Cl.
*G06F 17/00* (2006.01)
(52) U.S. Cl. ............................................. 463/30; 463/35
(58) Field of Classification Search .................... 463/30, 463/31, 34, 35, 43
See application file for complete search history.

(56) References Cited

U.S. PATENT DOCUMENTS

| | | |
|---|---|---|
| 3,748,750 A | 7/1973 | Viemeister |
| 5,676,551 A | 10/1997 | Knight et al. |
| 5,954,581 A | 9/1999 | Ohta et al. |
| 5,987,415 A | 11/1999 | Breese et al. |
| 6,185,534 B1 | 2/2001 | Breese et al. |
| 6,212,502 B1 | 4/2001 | Ball et al. |
| 6,249,780 B1 | 6/2001 | Mizokawa |
| 6,406,370 B1 | 6/2002 | Kumagai |
| 7,246,315 B1 | 7/2007 | Andrieu et al. |
| 7,309,283 B2 | 12/2007 | Nemitz |
| 7,452,268 B2 | 11/2008 | Annunziata |
| 7,574,332 B2 | 8/2009 | Ballin et al. |
| 7,667,705 B2 | 2/2010 | Sterchi et al. |
| 7,784,069 B2 | 8/2010 | Boss et al. |
| 2002/0082077 A1 | 6/2002 | Johnson et al. |
| 2003/0036431 A1* | 2/2003 | Futatsugi et al. ............... 463/43 |
| 2004/0038739 A1* | 2/2004 | Wanat .............................. 463/36 |
| 2008/0096533 A1 | 4/2008 | Manfredi et al. |
| 2010/0115449 A1 | 5/2010 | Sterchi et al. |
| 2010/0167819 A1* | 7/2010 | Schell .............................. 463/36 |

* cited by examiner

*Primary Examiner* — Michael Cuff
(74) *Attorney, Agent, or Firm* — James E. Larson

(57) ABSTRACT

In a computing machine having a processing unit, memory and a display device for playing a video game, the video game comprising at least one or more game characters, the at least one or more game character being controlled by a special purpose computing input device connected to said computer and operable by a game player, the video game further comprising character dialog between or among the at least one or more game characters, the character dialog comprising vignettes of dialog wherein movement from one vignette to another is determined by the game player introducing emotion into the dialog by means of the special purpose computing input device. The special purpose computing input device introduces emotion into the video game during a character dialog or character encounter along an axis of a joystick or other game controller element.

18 Claims, 26 Drawing Sheets

| 6-1 | 8 |
|---|---|
| Mechanics | |
| Node:6  Emotion Value:8 | |
| Exit Multipliers:Anger 1, Placate 1 | |
| Exit Additive Modifier:0 | |
| Possible Paths Leading Here:51 | |

| 6-2 | 1 |
|---|---|
| Mechanics | |
| Node:6  Emotion Value:1 | |
| Exit Multipliers:Anger 3, Placate 6 | |
| Exit Additive Modifier:4 | |
| Possible Paths Leading Here:37 | |

| 6-3 | -5 |
|---|---|
| Mechanics | |
| Node:6  Emotion Value:-5 | |
| Exit Multipliers:Anger 3, Placate 2 | |
| Exit Additive Modifier:2 | |
| Possible Paths Leading Here:20 | |

| 7-1 | 8 |
|---|---|
| Mechanics | |
| Node:7  Emotion Value:8 | |
| Exit Multipliers:Anger 1, Placate 1 | |
| Exit Additive Modifier:0 | |
| Possible Paths Leading Here:108 | |

| 7-2 | 3 |
|---|---|
| Mechanics | |
| Node:7  Emotion Value:3 | |
| Exit Multipliers:Anger 0, Placate 0 | |
| Exit Additive Modifier:5 | |
| Possible Paths Leading Here:108 | |

| 7-3 | -5 |
|---|---|
| Mechanics | |
| Node:7  Emotion Value:-5 | |
| Exit Multipliers:Anger 1, Placate 1 | |
| Exit Additive Modifier:0 | |
| Possible Paths Leading Here:57 | |

| 8-1 | 8 |
|---|---|
| Mechanics | |
| Node:8  Emotion Value:8 | |
| Exit Multipliers:Anger 1, Placate 1 | |
| Exit Additive Modifier:0 | |
| Possible Paths Leading Here:216 | |

| 8-2 | -5 |
|---|---|
| Mechanics | |
| Node:8  Emotion Value:-5 | |
| Exit Multipliers:Anger 1, Placate 1 | |
| Exit Additive Modifier:0 | |
| Possible Paths Leading Here:57 | |

FIG.9C

| Node 0 | |
|---|---|
| Previous Emotion Score: | 0.0 |
| Player Input: | 1.0 |
| Multiplier: | ×1.0 |
| Additive Modifier: | +0.0 |
| Adjusted Input: | 1.0 |
| New Emotion Score: | 1.0 |

FIG. 13A

| Node 1 | |
|---|---|
| Previous Emotion Score: | 1.0 |
| Player Input: | 1.0 |
| Multiplier: | ×2.0 |
| Additive Modifier: | +2.0 |
| Adjusted Input: | 4.0 |
| New Emotion Score: | 5.0 |

FIG. 13B

| Node 2 | |
|---|---|
| Previous Emotion Score: | 5.0 |
| Player Input: | 0.0 |
| Multiplier: | ×2.0 |
| Additive Modifier: | +0.0 |
| Adjusted Input: | 0.0 |
| New Emotion Score: | 5.0 |

FIG. 13C

| Node 3 | |
|---|---|
| Previous Emotion Score: | 5.0 |
| Player Input: | −1.0 |
| Multiplier: | ×4.0 |
| Additive Modifier: | +3.0 |
| Adjusted Input: | −1.0 |
| New Emotion Score: | 4.0 |

FIG. 13D

| Node 4 | |
|---|---|
| Previous Emotion Score: | 4.0 |
| Player Input: | −2.0 |
| Multiplier: | ×2.0 |
| Additive Modifier: | +1.0 |
| Adjusted Input: | −3.0 |
| New Emotion Score: | 1.0 |

FIG. 13E

| Node 5 | |
|---|---|
| Previous Emotion Score: | 1.0 |
| Player Input: | −2.0 |
| Multiplier: | ×2.0 |
| Additive Modifier: | +2.0 |
| Adjusted Input: | −2.0 |
| New Emotion Score: | −1.0 |

FIG. 13F

| Node 7 | |
|---|---|
| Previous Emotion Score: | 1.0 |
| Player Input: | 2.0 |
| Multiplier: | × 1.0 |
| Additive Modifier: | + 0.0 |
| Adjusted Input: | 2.0 |
| New Emotion Score: | 3.0 |

FIG. 13H

| Node 6 | |
|---|---|
| Previous Emotion Score: | −1.0 |
| Player Input: | 0.0 |
| Multiplier: | × 0.0 |
| Additive Modifier: | + 2.0 |
| Adjusted Input: | 2.0 |
| New Emotion Score: | 1.0 |

FIG. 13G

| Node 8 | |
|---|---|
| Previous Emotion Score: | 3.0 |
| Player Input: | 0.0 |
| Multiplier: | × 0.0 |
| Additive Modifier: | + 0.0 |
| Adjusted Input: | 0.0 |
| New Emotion Score: | 3.0 |

FIG. 13I

METHOD AND DEVICE FOR CONTROLLING PLAYER CHARACTER DIALOG IN A VIDEO GAME LOCATED ON A COMPUTER-READABLE STORAGE MEDIUM

PRIOR APPLICATIONS

This application is a continuation-in-part of U.S. non-provisional patent application Ser. No. 12/764,739, filed on Apr. 21, 2010, which is a continuation-in-part of U.S. provisional patent applications 61/179,429, filed on May 19, 2009 and 61/171,456, filed on Apr. 21, 2009.

BACKGROUND OF THE INVENTION

1. Field of Invention

The present invention relates a method and device for controlling player character dialog in a video game. More particularly, it relates to a method and device for controlling video game player character dialog for enhancing video game aesthetics and for making the player character dialog a more heavily weighted component of the video game drama through the use of a specialized input device for controlling, in real-time, said dialog of the video game located on a computer readable storage medium.

2. Description of the Prior Art

Video games for home use were first introduced in the early 1970's. Throughout the 1970's and 1980's the industry saw substantial and profitable growth. However, in the late to mid 1990's and through-out the first decade of the twenty-first century the industry has seen incredible growth, which has made it into a $10 billion industry, rivaling the motion picture industry as the most profitable entertainment industry in the world.

Part of this explosive growth has been a result from moving away from PC-based games to those played on gaming consoles such as Microsoft's X-Box® and Sony's Playstation®, inter alia, as well as online gaming over the Internet. Computer video games require the use of a controller (a type of input device) to interact with the game, which is connected to the video game console or a personal computer, by a cable or some form of wireless transmitting protocol. Although a game controller can be any input device used to control the video game, such as a keyboard or mouse, the more advanced games and gaming systems and consoles usually employ a gamepad, joystick, paddle or any other specialized device designed for gaming, which receives physical input from the game player in control of said device. A game controller (an example of one is shown in FIG. 8) is typically used to govern the movement or actions of a player character (an avatar) within the video or computer game on one a plurality of known computer readable storage mediums. This is most common in "Challenge-Type" games wherein the game is an obstacle course. In these types of games, the game player may be controlling the movements and actions of a player in a war scenario, wherein the game controller permits the game player to choose different weapons from a selection made available to the player by manipulating various buttons and switches on said controller. The player moves his character through a scene firing his weapon against an enemy (typically a non-player character or an "NPC") who is presented against the game player as an adversary. The desired result (i.e., the "fun" of the game) is for the game player to traverse the obstacle course with his player character within the video game and arrive at an end point of safety, all the while using his skill in marksmanship and physical agility, albeit in a virtual world, to kill, wound or otherwise disable his enemy without getting seriously wounded or killed.

In Challenge-Type games, dialog, which permits some level of interaction or control between encountered characters, is almost non-existent (or at least is not heavily weighted) as the purpose of the game (the "fun" or "interest" that is realized by the game player) is not to interact with others through narration, but instead is the thrill of killing or disabling your opponent before he kills you. This differs dramatically from "Narrative-Type" games wherein the fun or interest for the game player is in the unfolding story and the drama component of the game. That is not to say that some physical encounter will not occur in Narrative-Type games, which requires the game player to incapacitate, injure or kill another character he encounters. It is just that the narrative portion and the drama component that surrounds a character encounter is more heavily weighted in the programming of the game since the game developer is trying to appeal to a different type of game player, game interaction, the so called "aesthetics" of the game.

In prior art video games, especially those that are based on a more heavily weighted Narrative-Type aesthetic, the dialog between the game player character and an encountered character (be it an NPC or another actual game player character in a dual or multi-player game) has been hereto before controlled through the use of dialog trees, like that seen in FIG. 7. A video game dialog tree (or conversation tree) is a video game mechanic, based upon a hub, that provides the game player an opportunity to "choose" what to say from a pre-defined, and usually very limited, number of choices (i.e., two to five is very common). The game player enters this mode by choosing to speak with an NPC (or when an NPC chooses to speak to the game player's character based on the video game programming). A menu is provided and the game player chooses a line of pre-written dialog from the menu by physically engaging an input device. Upon choosing what to say, the non-player character responds to the player, and either the player is given another choice of what to say, the conversation ends or the desired result is achieved (i.e., a door is opened). The conversation could also end when the player selects a farewell message or when the non-player character ends the conversation because there is nothing left to say. Further, a bad choice could be made by the player character, which ends the conversation and starts a fight, by way of a further example. What is important to note that in the prior art, through the use of dialog trees, the game programmers have decided on what the game player can say. The game player is given no opportunity to inject any emotion by his choice of the limited replies presented to him. Instead of living the drama as a game player, in actuality he is just watching the drama unfold, much like watching a movie. The game player is therefore given no opportunity or inclination to inject his own personality into the dialog through the use of his player character. This has an undesired effect of breaking absolutely, or severely limiting, the believability of the particular conversation and consequently the overall believability of the video game itself.

Almost all prior art video games utilizing dialog trees offer the option to repeat what was said by the non-player character, which allows the game player to replay parts of the conversation in which they did not pay attention to, or simply because they desire to return and "start over." These types of dialog tree conversations are almost always designed with the tree structure architecture, with players deciding between each branch of dialog to pursue. Game players may then return to an earlier part of the conversation tree and repeat them over and over again, much like a person watching a video movie who rewinds it over and over again to re-watch a portion or portions of the drama that he missed or to which he did not pay attention. Each branch of the tree is essentially a different menu of choices, and each choice that the player makes triggers a response from the non-player character followed by a new or different menu of choices of responses. Video games that employ these dialog tree structures typically lead the game player into "meta-gaming," a form of "looped" game playing wherein the game player is more engaged, and therefore more interested, in trying to figure out what the game developer expects of him and what he may want him to say or do to achieve a certain goal. The meta-gaming game player is then rewarded in some way, instead of living and experiencing the drama of the encounter, by checking every answer to see where the path leads. He is not engaged and encouraged to just choose one answer based upon how he feels at that moment and then just moving forward without regard or interest in where the other paths lead, a so-called "single pass-through dialog." Instead he is obsessed in knowing where each branch of the tree will lead him and subsequently detaches himself from the drama component of the game to the point of being a watcher of a movie and not a game player. Momentum in the game is totally destroyed because he is thinking outside of the game and has no inclination of the player character's own (albeit artificial) personality. Further, meta-gaming reduces the reality of the game encounter as real life scenarios almost never provide a person with a choice of responses from a selection of pre-defined answers only to see where each answer will lead him and then choosing his "best" answer based upon this knowledge for achieving a certain goal or to be given a certain reward. Real life drama contains emotion and almost always requires a person to make a choice based upon how he feels at that moment. This lack of emotion (this "thinking outside of the game") and the use of tree structure architecture to build character dialog is a severe limitation in prior art video games and especially in those games that are heavily weighted as Narrative-Type games, since the purpose and reason for interest in these games is typically the drama component and momentum of the encounter and how that drama plays out and how that affects the player emotionally. Dialog trees end up creating "simulated" conversation since they permit the game player to hit dead ends and then loop back around until he finds the answer that he thinks will lead him to the next level or prize. Further, the "choice" aspect of answers that the game player is provided with freezes the drama while he decides which branch of the underlying dialog tree he wishes to choose, thereby further destroying the believability of the game. Therefore, improvements are clearly needed in player character encounter dialogs in all video games on computer readable storage mediums and especially in those whose in which the aesthetic framework is more heavily weighted or geared towards a Narrative-Type drama.

Some early attempts to make the character dialog more interactive and "fun," but still relied on traditional dialog trees, can be seen in X-Men Legends II™ wherein its dialog trees were a bit more complex. In particular, a player could obtain different dialog from a character depending on whether you encountered him/her as an X-Man, a Brotherhood member, or the character in which he or she has special dialog. Still, this did nothing to advance the art past pre-programmed dialog trees and into a realm of introducing emotion and momentum into character encounters by use of an input device, which then affects the outcome of that encounter, and wherein different levels of two opposing emotions can be introduced within a single encounter in order to make the narrative encounter a more integral part of the game drama. The aforementioned prior art game also did not discourage meta-gaming, but instead encouraged a player to engage in such behavior.

Another attempt to expand on character dialog appeared in The Elder Scrolls III: Morrowind™, wherein you could choose what to talk about with the NPC's in a dialog tree, including, for example, "Lore," "Background," and "Race." The NPC responses on one topic could include the names of topics that were new to the player character, allowing the player to select these new topics in the dialog with any NPC having a response to that topic. Certain classes (and individuals) had more responses available (i.e., priests would talk more about the gods, while savants would talk about most everything included in the game). However, here again, the game was limited to dialog trees, which encouraged the game player to meta-game and more importantly prohibited the player character from making the character encounter a true integral part of the game drama. No real-time emotional responses could be used to affect the NPC responses, let alone the action of the game, that were not at least pre-programmed by the game developers, which were then severally limited. One can clearly see the common thread and ultimate problem with video games employing dialog trees such as these. The game developer ultimately decides how you, the avatar, or player character, are going to feel and thereby takes away any natural true human trait, which is with us in every personal encounter we have in life—that is to say, emotion. This has the result of seriously reducing game drama as it applies to the narrative aesthetic, severally reducing game momentum and operates to reduce overall interest in such game.

Yet still another attempt to impart emotion into a video game was found in X-Files: The Game™, which allowed the player character to select what kind of emotional response your avatar would give to certain lines in character encounters. Certain events would then change depending on how you decided to respond. For example, if the player character chose an abundant of "paranoid" answers, this may cause a dead body to suddenly twitch or move in the morgue where the player's avatar was located. Although this game attempted to introduce player emotion into the game, it does not rise to the level above and upon the circular nature and severe limitations of dialog trees, like that seen in FIG. 7. This prior art video game also encourages meta-gaming by tempting the game player to see how the different emotions affect the surrounding environment (i.e., "what will happen if I choose this emotion"—classic meta-gaming distraction). All drama of the encounter or event is again lost by the player thinking about "what does the game developer want me to do." And so therefore, this prior art video game did little to progress the art away from dialog trees and circular character encounters and it certainly failed to move the art towards making the character encounter and the associated dialog of that encounter an integral part of the game drama so that game momentum was retained.

However, further attempts in the prior art are still being made at improving the drama of character dialog, albeit they are falling quite short of imparting true player character emotion into the video game. Such can be seen in the yet to be released video game called Alpha Protocol™. In this game, a spy RPG game, the avatar chooses a handler for his spy mission at the beginning of the game. Based upon the choice of handler, a different set of chat responses or positions will be provided for character encounters. For instance, one handler choice may provide chat responses that are based upon being suave, professional or having an aggressive behavior. Another handler choice may provide chat responses based upon being aggressive, having the ability to bluff or just being honest. Yet another may provide for anger, curiosity or an investigative approach. Yet still another may provide a demanding attitude or friendliness or even being official. Some handler choices, but not all, also provide a quick "end conversation" approach a so-called "shut them up" choice, which is based solely upon action, whereby the avatar will resort to immediate violence. All of these chat responses or positions are timed based during a character encounter and a choice must be made from one of the different responses within the pre-programmed time, set by the game developers, as represented and seen in FIG. 6.

Although certainly considered an improvement over the previous prior art games, wherein the avatar merely chooses from a set of suggested, pre-programmed responses that are listed as "A) B) & C)," the dialog system to be seen in Alpha Protocol™ (know as the "Dynamic Dialogue System") is really just another traditional dialog tree, with a different visual approach; the underlying mechanics are the same. In other words, the choices that are presented to the avatar are pre-programmed choices that are based upon a specific attitude or emotion that is affiliated with the handler, of whom was chosen at the off-set of the video game or mission, and which were pre-programmed by the game developer. Once chosen, the player character is stuck with those emotions. And so he is unable to affect player encounters, and therefore the dialogs associated therewith, by not being able to choose what emotion he is feeling "right now," which could then affect the outcome of the player encounter. Even though the avatar is not presented with a specific response that he can see in this recent prior art game, he is provided with a specific pre-programmed emotional response or "attitude," which is based upon the attributes of his handler (determined by the developer) and he must chose his response against an expiring clock. This does not allow the player to control the emotions of his avatar in a fluid and dynamic manner within each dialog, whereby anger and placation, for example, can be introduced alone, one after another or back and forth, so that specific results can be achieved by the game player through his avatar and which thereby makes the dialog an integral component of the drama of the video game and maintains game momentum. And so it can be seen that the dialog system of Alpha Protocol™ is rooted and programmed following a traditional dialog tree, which is circular in nature (as seen in FIG. 7) and tending to lead to meta-gaming by the game player.

And therefore, it is clearly seen that improvements are needed in character dialog in video game character encounters that truly allows the game player to inject his or her actual emotion in response to the encounter by means of an input device, which then will create heightened drama in these character encounters that are dynamic, fluid and unpredictable and which will allow the narrative aesthetic to be a more integral part of the video game and its drama and which maintains game momentum.

SUMMARY OF THE INVENTION

I have invented a method and device for controlling character dialog in a video game for making the dialog a greater component of the drama in the video game. My method and device permit actual and real life emotions such as anger and placation, an example of just two opposed emotions from many, to be introduced into character dialog making it a more fluid activity of the game and allowing the emotions of a game player to have a larger outcome in the dialog. By doing so, the dialog or conversation trees seen in the prior art have been eliminated, which operates to keep the game player affixed within the drama of the overall game and in each particular dialog encounter as they occur. The game player is therefore surrendering to the nature of the confrontation (the concept of momentum). This in turn makes the game player more realistically feel the emotion of the video game by making the drama the reward, prize or fun of the game, thereby maintaining and even increasing game momentum. My method, and the device that controls it, does not employ any dialog loops. Instead it employs single pass-through dialog.

My method and device also assist in directing the game player away from meta-gaming by keeping him focused on each encounter through the use of his emotions and not focused on a list of predefined responses preprogrammed by the game developer. The emotions are imparted into the video game character encounter by a computing input device, such as a video game controller, like the one seen in FIG. 8. Accordingly, the game player, through his player character, chooses the emotional state instead of simply choosing what to say from a pre-defined list presented on the video screen. To be more precise, my novel method, and the device that actuates it, separates the player's ability to measure a decision, like that of the prior art, to actually making the decision, and one which is based on his real-life emotional state.

My method and device operate by providing a computing input device, such as a game controller, having a switch, joystick or button (or other like player engaging structure). The controller allows the introduction of at least two opposed emotions along a line or axis wherein graduated levels or amounts of the particular emotion chosen from the at least two opposed emotions can be introduced into the character dialog. The amount of emotion to be introduced and maintained is based upon how the game player feels when a question, response or statement is presented by the other character (s) of who is/are part of the particular game encounter (i.e., the dialog). Nothing herein limits the other character from being only non-player characters (or "NPC"); however, by way of the forthcoming example, an NPC will be used as the encountered "other character."

In my method, and by way of use of my controller device wherein the choices of either anger or placation can be introduced into character dialog, a game player moves through a scene of a video game and encounters another character. For any number of reasons, the other character asks the game player a question or makes a statement. In response to the NPC statement or to the NPC answer that is provided to the game player character's question, the game player listening to the dialog asks himself, "how does this make me feel?" Based upon how he feels, and not based upon a preset dialog tree from which a stock answer most be chosen from a provided list on the video display, the game player engages the controller device along a graduated number of levels of anger or placation to introduce how he feels, without knowing how that emotion will initially be construed by the NPC or how it will affect the outcome of the dialog, let alone what his exact words will be. Further, once the emotion is introduced, the effects of it can not be removed at least in terms of how the NPC will react to such emotion. However, the player character can continue the dialog and change his emotion when appropriate when dictated by the drama. In this manner, it is not a chosen preset response that rewards the game player, but the emotional dialog that the actual player chooses to introduce taken from his own set of real life emotions or those that he chooses himself to introduce with the controller or other input device. Further, the emotional state introduced by use of the controller can be "locked-in" such that the chosen state is maintained. In a preferred embodiment, this is accomplished with any one of a multitude of available buttons on the controller (like the one seen in FIG. 8). However, other functions can be used to not only lock-in the emotional state, but also to input it directly when required. Other inputting and lock-in functions or devices include, but are not limited to, visual and audio signals, motion sensing technology, such as the forthcoming X-Box™ Natal™ system, or others, as well as elapsed time.

In my method and by using my device, the player character enters each dialog encounter with a value of zero, as to his emotional state. That is to say, in the preferred embodiment, that any subsequent dialog encounter to a previous dialog encounter is not influenced by said previous encounter simply because the game player chose one emotion or another or ended the encounter in a certain emotional state. However, in an alternate embodiment, my novel method and device permit the video game to maintain a log of the player character emotional responses (the cumulative value) and to act as a learning system for the player character on how he typically responds. This then creates an "order and chaos factor" that attaches itself to the player character as he moves through the video game. So, by way of example, if the player character uses more anger than placation when engaging in character dialog, then more instability will be experienced as the game progress and thereby more challenge will be introduced at each subsequent encounter. The player character will then find that an increased response to his anger allows him to reach his "challenge" goal more quickly. And conversely, if the game player chooses to use more placation than anger, when encountering character dialog, then his dialog experience will tend to stay in the narrative form longer thereby creating a more dramatic game experience based upon character dialog interaction. This feature is meant to tailor the game experience more closely to the desire of each player. The method encourages the game player to choose more placation if he hopes to experience the "narrative" aesthetic or conversely encourages the game player to choose more anger if he hopes and desires to experience a "challenge" aesthetic. This has never been seen before in the prior art since all prior art games allow the game programmer to decide whether the aesthetic of the game will be challenge or narrative, by way of two examples chosen from many others that are available. My novel method and device controller therefore permits one video game to be introduced into the market, yet be tailored to multiple different aesthetic goals, as will be further described hereinafter.

My novel method and the device to control said method of the present invention can also be used with emotions other than anger and placation and is dependent on how the game programmer decides to tailor the game. It has been suggested by some gaming industry programmers and academics that there is a formal approach to understanding games that follows a so-called "MDA Framework." "M" stands for Mechanics; "D" stands for "Dynamics" and "A" stands for "Aesthetics." In this approach, the Mechanics are the particular components of the game at the data and algorithmic level, or the actual computer programming. The Dynamics are the events and actions that occur (real-time activity) based upon the Mechanics as a result of game player input. And the Aesthetics are the desired emotions obtained from the game player as they experience the Dynamics through control of the Mechanics. Therefore, the aesthetics of a game can be tailored by what type of "fun" is to be realized. In doing so, it is suggested that there are eight (8) different types of fun associated with video game experiences. These include Sensation, Fantasy, Narrative, Challenge, Fellowship, Discovery, Expression and Submission. It is understood that no game is tailored to just one of these eight types of fun, but instead some are weighted more heavily than others and some are excluded altogether. By way of example, in a war game, such as Call to Duty®, Expression, Narrative and Fantasy will be of little use, if not excluded altogether. However, in return, the Aesthetics of Challenge, Sensation and Submission will be heavily used to create the fun experience for the game player.

Therefore, in the present method, the type of fun that the programmer desires a game player to have, will dictate or be influential in the types of emotions chosen to be employed by the game player.

Further, the present method and device can use more than just two opposed emotions. For example, it can also introduce agreement and disagreement along a separate axis of a controller joystick. Therefore, if anger and placation are used along the "x" axis in the 12 and 6 o'clock positions, respectively, then agreement and disagreement can be used along the "y" axis at the 9 and 3 o'clock positions, respectively. In this method, varying levels of the chosen emotion can then be mixed with agreement and disagreement to open up an even greater number of possible dialog choices that further pulls the game player into the drama of the conversation and away from meta-gaming.

It is therefore a first object of the present invention to provide a method and device controller for introducing real life emotions into a video game in real time.

It is a further object of the present invention to eliminate meta-gaming in a video game by removing pre-programmed decision trees (or dialog trees) in a video game.

It is yet a further object of the present invention to influence a character dialog in a video game through the use of an emotional scale and a device that controls said scale within the video game.

It is yet even a further object of the present invention to provide a desired game player chosen video game aesthetic chosen from a multitude of game aesthetics based upon use of the computing input device.

It is even yet another object of the invention to create momentum within single vignettes of dialog drama, even though a single character encounter may contain a plurality of vignettes, through manipulation of the computing input device.

It is even another object of the present invention to provide single pass-through dialog.

BRIEF DESCRIPTION OF THE DRAWINGS

The detailed description of the invention, contained herein below, may be better understood when accompanied by a brief description of the drawings, wherein:

FIG. 9C illustrates columns 6 through 8 of FIG. 9 and the values associated of each dialog card having certain mechanic determiners that affect the pathway of the character dialog of the present method based upon an initial input of emotion by the player character using the computing input device, wherein column 8 represents the end of the conversation;

FIG. 13A is a table that illustrates how a New Emotion Score is calculated for a player character using my novel method and device during a character encounter with dialog in a video game with specific reference to Node 0 of FIG. 11;

FIG. 13B is a table that illustrates how a New Emotion Score is calculated for a player character using my novel method and device during a character encounter with dialog in a video game with specific reference to Node 1 of FIG. 11;

FIG. 13C is a table that illustrates how a New Emotion Score is calculated for a player character using my novel method and device during a character encounter with dialog in a video game with specific reference to Node 2 of FIG. 11;

FIG. 13D is a table that illustrates how a New Emotion Score is calculated for a player character using my novel method and device during a character encounter with dialog in a video game with specific reference to Node 3 of FIG. 11;

FIG. 13E is a table that illustrates how a New Emotion Score is calculated for a player character using my novel method and device during a character encounter with dialog in a video game with specific reference to Node 4 of FIG. 11;

FIG. 13F is a table that illustrates how a New Emotion Score is calculated for a player character using my novel method and device during a character encounter with dialog in a video game with specific reference to Node 5 of FIG. 11;

FIG. 13G is a table that illustrates how a New Emotion Score is calculated for a player character using my novel method and device during a character encounter with dialog in a video game with specific reference to Node 6 of FIG. 11;

FIG. 13H is a table that illustrates how a New Emotion Score is calculated for a player character using my novel method and device during a character encounter with dialog in a video game with specific reference to Node 7 of FIG. 11; and FIG. 13I is a table that illustrates how a New Emotion Score is calculated for a player character using my novel method and device during a character encounter with dialog in a video game with specific reference to Node 8 of FIG. 11.

DETAILED DESCRIPTION OF THE PREFERRED EMBODIMENT

Figure 1:
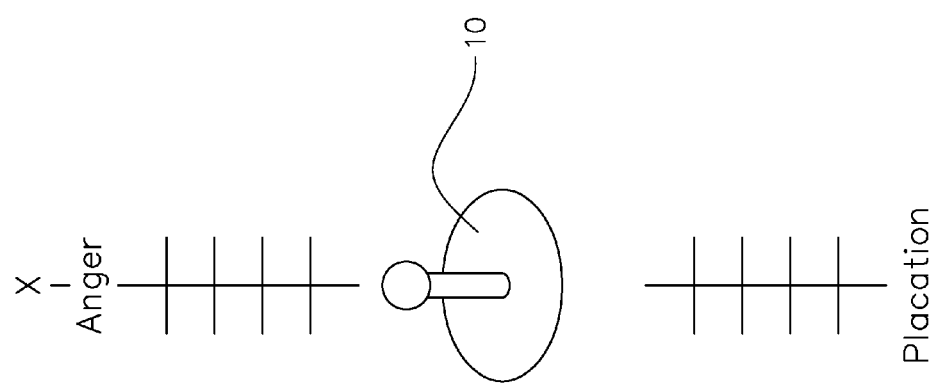
FIG. 1; illustrates both a graphical representation of how two opposed emotions are programmed in the method of the present invention and also how mechanically those two opposed emotions can be provided for introduction into a video game by a game player on a game controller along an "x" axis.

Referring to FIG. 1, a graphical representation is shown of a vertical "x" axis having two opposed emotions (anger and placation) positioned at the 12 and 6 o'clock positions, respectively. The two opposed emotions of anger and placation of the method and on the device (i.e., a console game controller) of the present invention are used for illustrative purposes only herein and does not limit the present invention to just these two emotions. A multitude of varying opposed emotions could be used to affect the method or operate the device of the present invention.

Also shown on FIG. 1, joystick 10 is positioned along the x axis at a middle portion, which can be operated along the x axis in opposed directions to introduce the two opposed emotions of anger and placation and done so in varying degrees from slight anger to extreme anger and from sight placation to extreme placation. Nothing herein limits the degrees to just four levels as indicated by the hash marks shown along the x axis. The hash marks are merely used to illustrate that some definable value of emotion can be introduced into the video game and then controlled by the device such as a game controller. The levels of emotion can be any number less than or more than zero or any fraction thereof. Accordingly, and merely by way of example, positive or negative values of 1, 2, 3 and 4 can be introduced or fractional values having either a positive and negative value can also be introduced, such as 1.1, 1.2, 1.3, and so on. Further, as shown FIG. 1, the introduction of a positive value, by placing pressure on joystick 10, introduces anger, and the introduction of a negative value, also by placing pressure on joystick 10, but in the opposite direction, introduces placation.

Figure 2:
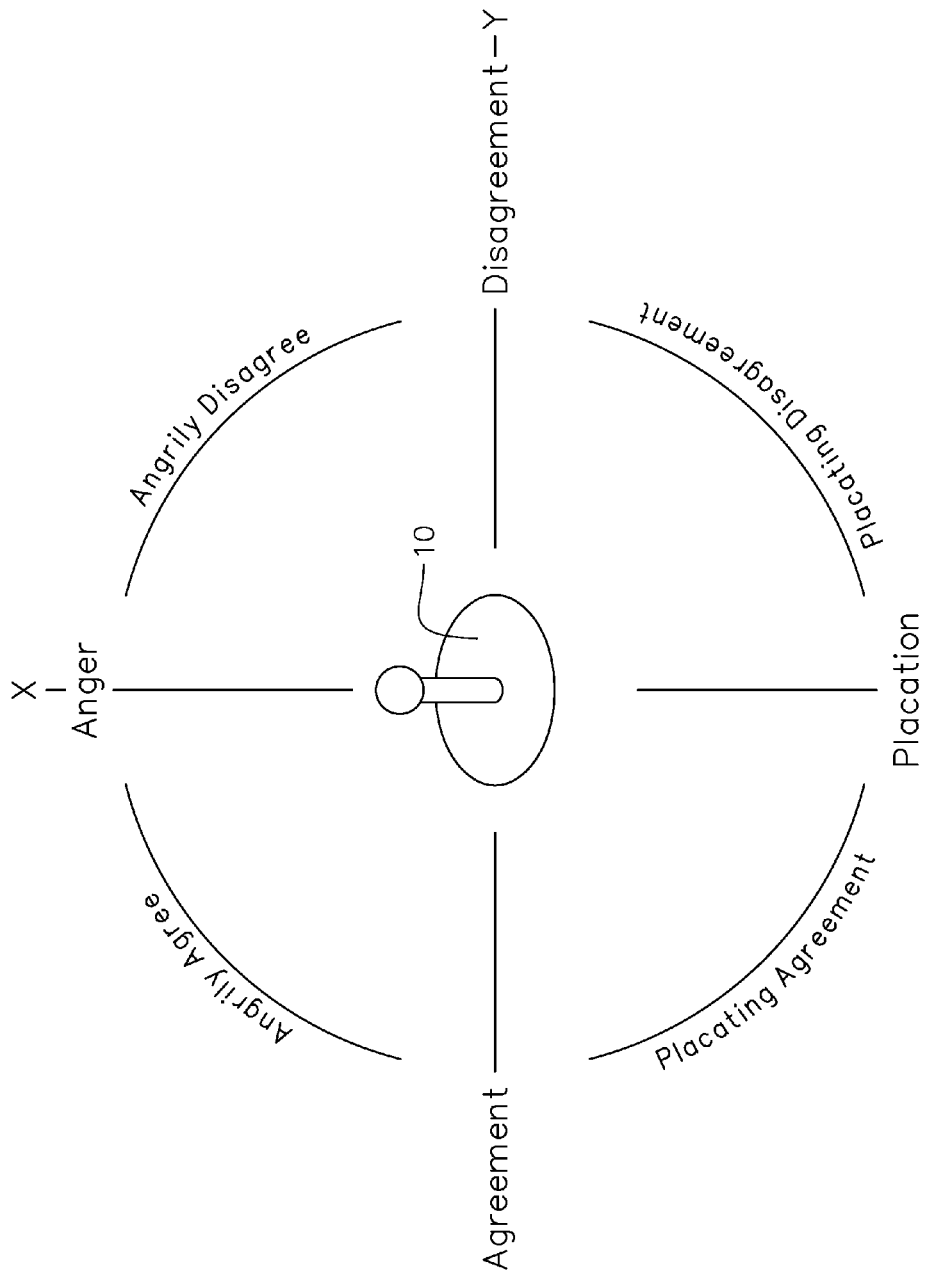
FIG. 2; illustrates both a graphical representation of how two opposed emotions and the acts of agreement and disagreement are inputted into the method of the present invention and also how mechanically those two opposed emotions can be introduced into a video game by a game player on a game controller along an "x" axis and the acts of agreement and disagreement can be introduced along a "y" axis, with an understanding that control of the game controller joystick can also introduce varying degrees of an emotion in combination with the act of agreement or disagreement.

Referring to FIG. 2, an alternate embodiment of the present invention is shown wherein the emotional vertical x axis is intersected by a horizontal "y" axis, which is used to introduce, in this example, agreement or disagreement in a character dialog in a video game. Although not limited to just these two choices, in the example of FIG. 2, agreement is located at the 9 o'clock position and disagreement is positioned at the 3 o'clock along the y axis. Other opposing responses could be used that are predicated upon beliefs, attitudes, experiences and personal knowledge, which are the typical the driving forces in these types of responses.

As shown in FIG. 2, joystick 10 can again be used to introduce the game player's character's choice of response. Although hash marks are not shown herein, it is understood that some definable number of levels of agreement and disagreement (or other responses) can be introduced from a number less than, equal to or greater than zero and any fraction thereof as described directly above. Such description is incorporated herein.

Still further to FIG. 2, it is shown that the intersection of the x axis and the Y axis creates four quadrants, which are a hybrid, or a mix, of the emotion that was introduced in combination with the agreement or disagreement choice injected into the character dialog of the video game. As can be appreciated, the number of dialog outcomes is expanded by a great number over that of the example in FIG. 1, wherein only emotion is introduced. In using the example of FIG. 2, but with an understanding that other emotions could be used along the vertical x axis and that different response choices could be employed along the horizontal y axis, the four quadrants created are "Angrily Disagree" between 0-90 degrees (Quadrant I), "Angrily Agree" between 270-360 degrees (Quadrant II), "Placating Agreement" between 180-270 degrees (Quadrant III) and "Placating Disagreement" between 90-180 degrees (Quadrant IV). And, any degree between the ranges of degrees in each of the four quadrants could be introduced. So, by way of example, the game player's character could angrily disagree at 70 degrees, which would be a stronger disagreement than at 10 degrees (i.e., he is moving away from the 90 degree position of total disagreement along the horizontal y axis and moving more towards agreement located at 270 degrees, but with anger dictated by the movement forward (upward) along the vertical x axis with joystick 10. Any of the four quadrants can be utilized in this manner to introduce a plurality of varying emotion in combination with the agreement/disagreement choice. Examples of the remaining quadrants will not be set provided as it is understood by this one example how the different quadrants operate.

Figure 3:
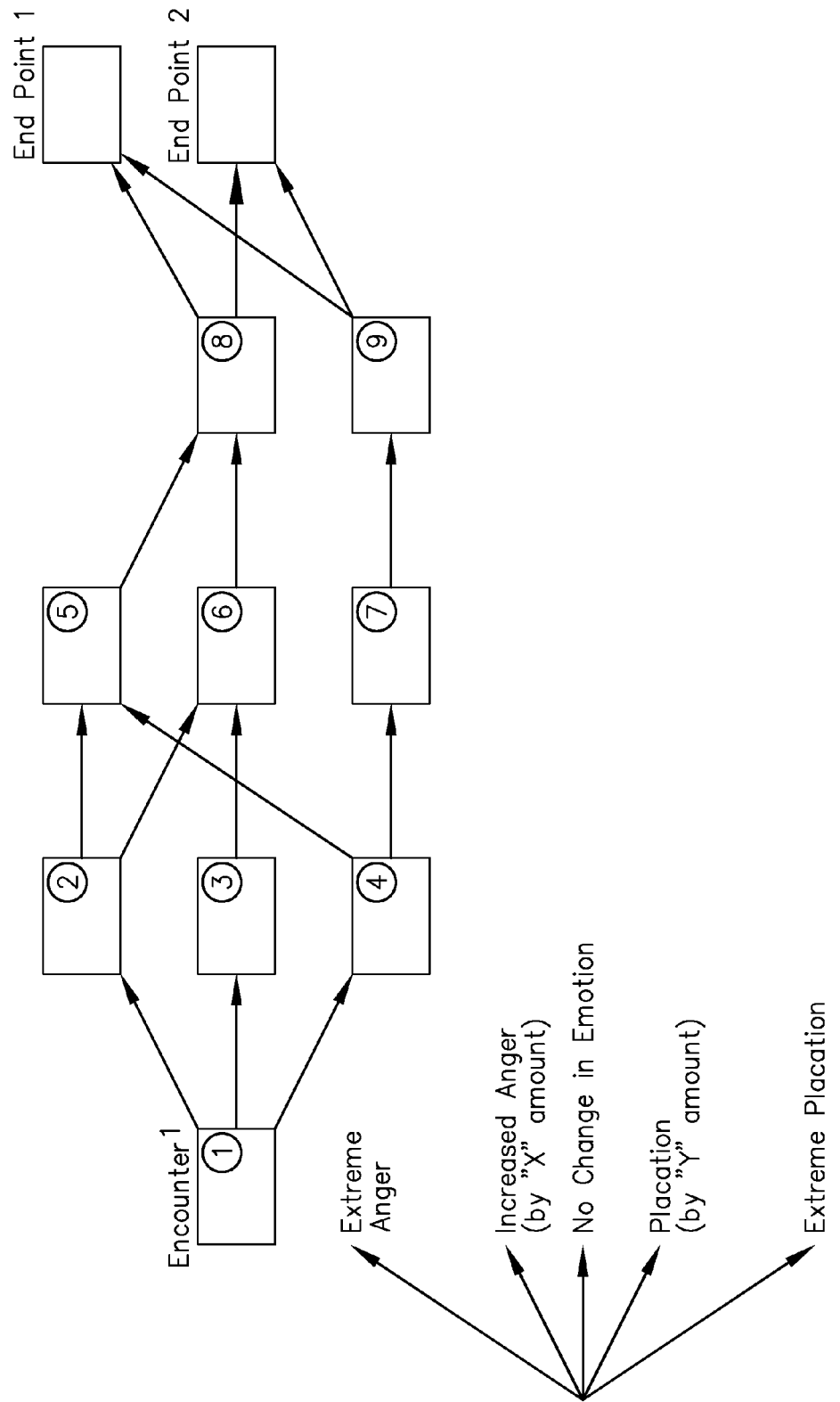
FIG. 3; illustrates a first simplified diagram of a dialog encounter between at least two game characters in a video game using my novel method and input device, wherein the emotions of anger and placation dictate the direction of the single pass-through dialog, but along multiple pathways to at least two end points.

Referring now to FIG. 3, a simplified flow diagram is shown wherein a first Encounter[1] dialog is represented by block 1. As shown in an index of FIG. 3 (as well as FIGS. 4 and 5), all in the lower left hand corner of each figure, respectively, certain angled arrows represent different states of emotion, which can be introduced into a dialog sequence or "vignette." The arrows themselves do not represent single numerical values that must be introduced when using a device such as a game controller to move from one vignette block to another, but instead represent threshold amounts of actual emotion that must be reached, which are aggregate within each vignette as well as throughout the entire encounter that are calculated by player input against individual vignette pre-programmed additives and exit multipliers and modifiers (to be more fully discussed in detail in FIGS. 10-12). The agreement and disagreement x and y axis will not be used in the example of FIG. 3, nor in the examples of FIGS. 4 and 5 either, as it is well understood how they can be used by the description directly above.

In the index of FIG. 3, a horizontal axis (not to be compared or confused with the description of FIGS. 1 and 2) represents no change in emotion (no increase or decrease to the current aggregate level of emotion) or no response by the game player character. It is important to understand that the no change of emotion could be a "no change in anger" or a "no change in placation." Nothing herein limits that the "no change of emotion" arrow means neither placation nor anger. Instead it just means that the current state of emotion, be it placation or anger, has not changed its numeric value due to no engagement of joystick 10 when presented with a question or statement by an NPC or other game character. Each block in FIG. 3 is numbered sequentially and each represents a "vignette" or dialog sequence between two or more characters. However, in the preferred embodiment, the method of the present invention uses a dialog sequence between two characters in a video game. Further, nothing herein limits each vignette to one statement/question and one emotional response. Each vignette can contain numerous question/statements and emotional responses or just one set for each.

With continuing reference to FIG. 3, and by using the example that there is only one NPC question/statement and one game player character emotional response, for simplicity purposes, dialog Encounter$^1$ occurs. In response to a statement or question posed by an NPC, the game player character increases his anger to some amount wherein the aggregate amount of anger (some unknown threshold to the game player) leads him to vignette block number 2. However, no change of emotion or no response moves the game player character to vignette block number 3, while placation (lowering the level of anger or other current state of emotion by some unknown threshold number by the game player) takes the game player character to vignette block number 4. Now in this example, depending on which vignette the game player character finds himself, it can be seen that he can never get to either End Point 1 or End Point 2 by passing through the yet unknown dialog that occurs in vignette block numbers 7 and 9 unless the game player character had placated to a threshold level at Encounter$^1$ that permitted him to move to vignette block 4. This illustrates how a player may placate but may not necessarily go to a certain dialog pathway, because the placation did not reach the required threshold level. In other words, placation to some threshold number may take the player along a pathway wherein the changes of emotion will simply have no effect on the moving the game character out from said defined directional pathway until he reaches some required end point. For avoidance of doubt, moving from one vignette block to the next represents the movement along a single pass-through dialog sequence, of which there are a multitude of said sequences depending on what subsequent vignette block is reached each time the game player imparts pressure to joystick 10 on the computing input device.

Further to FIG. 3, if the game player character increased his anger to a certain aggregate threshold level, he would have moved to vignette block 2, which can then lead him to End Point 1 by first not changing his emotion (or not responding) and then moving to vignette block 5, and then thereafter placating to move to vignette block 8 and then finally increasing his anger again to move to End Point 1, or a "no change in emotion" to move to End Point 2. Or, he could have placated at vignette block 2, which then moves him to vignette 6; thereafter, his only choice is to maintain his emotion (or not respond), which moves him to vignette block 8, whereby an increase in anger gets him to End Point 1 and no change in emotion takes him to End Point 2. All of the above movements through the vignettes and through the dialog drama again presume that certain aggregate threshold levels have been reached, or have fallen there below, based upon the pressure exerted upon joystick 10 to impart a certain value in combination with pre-defined values for additives, multipliers and modifiers of each vignette block. To avoid any doubt, the emotional decisions being made are based on what the game player is hearing and seeing and how the drama is unfolding (i.e., the momentum of the game). If he feels angry all of sudden, and he has been placating, then he can shift his emotion, but that is based purely on the drama and of not knowing what vignette he is in and how close he is to reaching a specific end point (i.e., removal of meta-gaming). And, if a certain vignette does not allow a "higher" or "lower" move to another vignette, regardless of his attempt to add to his exiting aggregate anger or placation, then he will just move along horizontally until such time he reaches a defined end point or such aggregated anger or placation passes a threshold value that allows him to move to a vignette of increased anger (and therefore more challenged aesthetics, by way of example) or increased placation (and therefore more narrative aesthetics, by way of another example).

With continuing reference to FIG. 3, if the game player had not changed his emotion at Encounter$^1$, he would then move to vignette block 3, which only gives him the option to move to vignette block 6, which again gives him only one option and that is move to vignette 8, regardless of whether he completely placates or "freaks-out". In this example, no "doors" are opened to other vignettes regardless of his emotional state or desire to change his current emotional state by use of the computing input device. At vignette 8, however, he can either maintain his emotion (or no respond or placate) and move to End Point 2 or increase his anger to some threshold value, unknown to the game player while the drama is unfolding, and move to End Point 1.

If however, the game player had placated to the proper threshold level at Encounter$^1$, then he would have moved to vignette block 4. Here, extreme anger can take him to vignette block 5 and provides him all of the options that are available, as previously described before at vignette block 5. Or, the game player can maintain his emotion (or not answer or continue to placate) and he then moves to vignette block 7 and then again maintains his emotion (or introduces the other non-threshold exceeding emotional values) and thereby moves to vignette block 9. But here, the game player character has found that he is in an interesting position wherein only increased anger (taking him to End Point 2) and extreme anger (taking him to End Point1) can get him out of this encounter. The character can placate as much as he wants, but it will only take him to the lowest card in the subsequent column (not shown here, but will be fully described in the detailed description of FIGS. 10-12).

Figure 4:
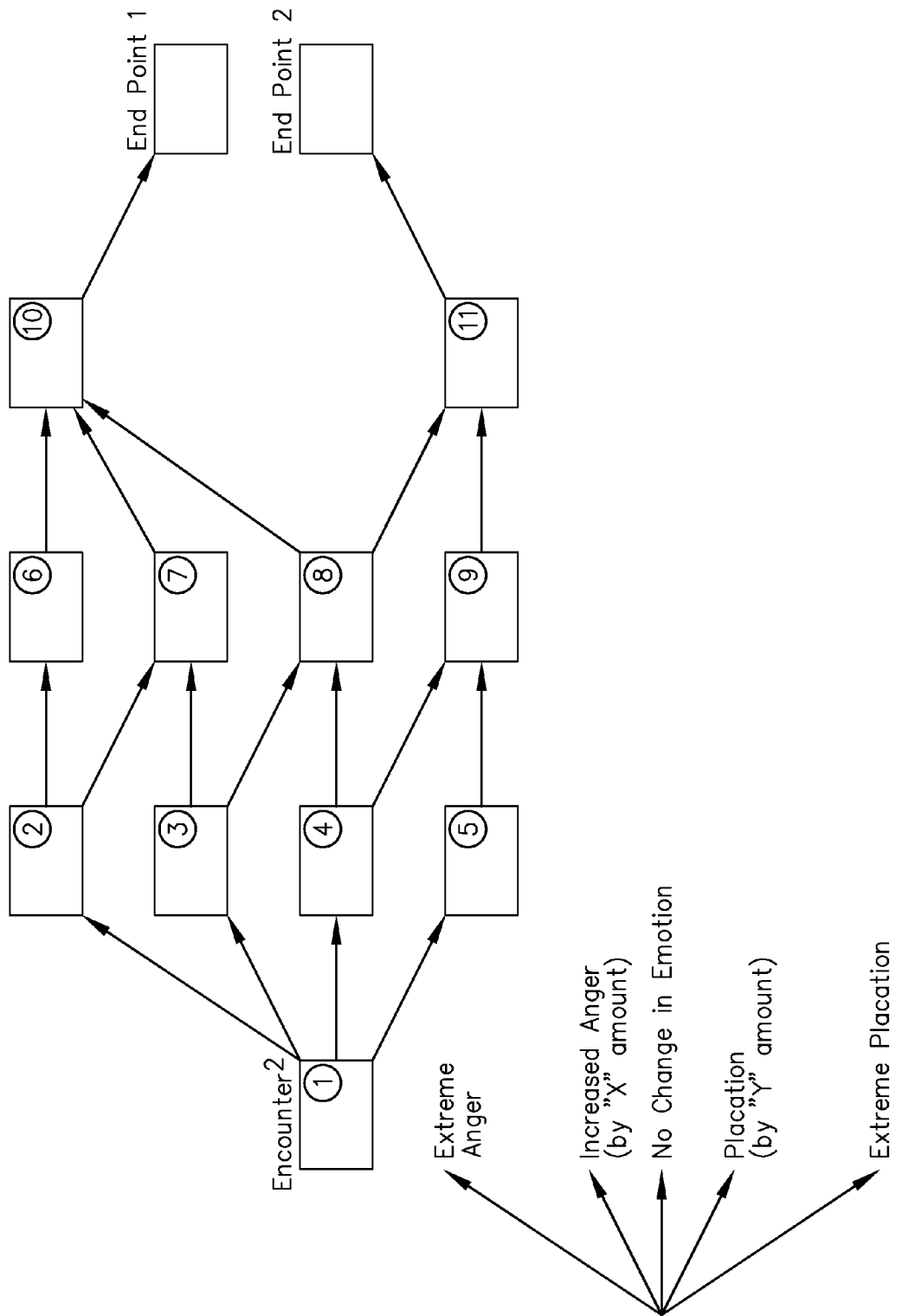
FIG. 4; illustrates a second simplified diagram of a dialog encounter between at least two game characters in a video game using my novel method and input device, wherein the emotions of anger and placation dictate the direction of the single pass-through dialog, but along multiple pathways to at least two end points.

Referring now to FIG. 4, another simplified flow diagram is shown where an Encounter$^2$ is carried through. In such encounter the game player character can introduce four different emotional states having certain threshold values. He can introduce extreme anger, which takes him to vignette block 2, increased anger, which takes him to vignette block 3, no change in emotion (or no response), which takes him to vignette block 4 or placation, which takes him to vignette block 5. The remaining details of how the player reaches either End Point 1 or End Point 2 is understood by the above set forth logic and description that occurred in FIG. 3. FIG. 4 merely represents a different encounter scenario.

Figure 5:
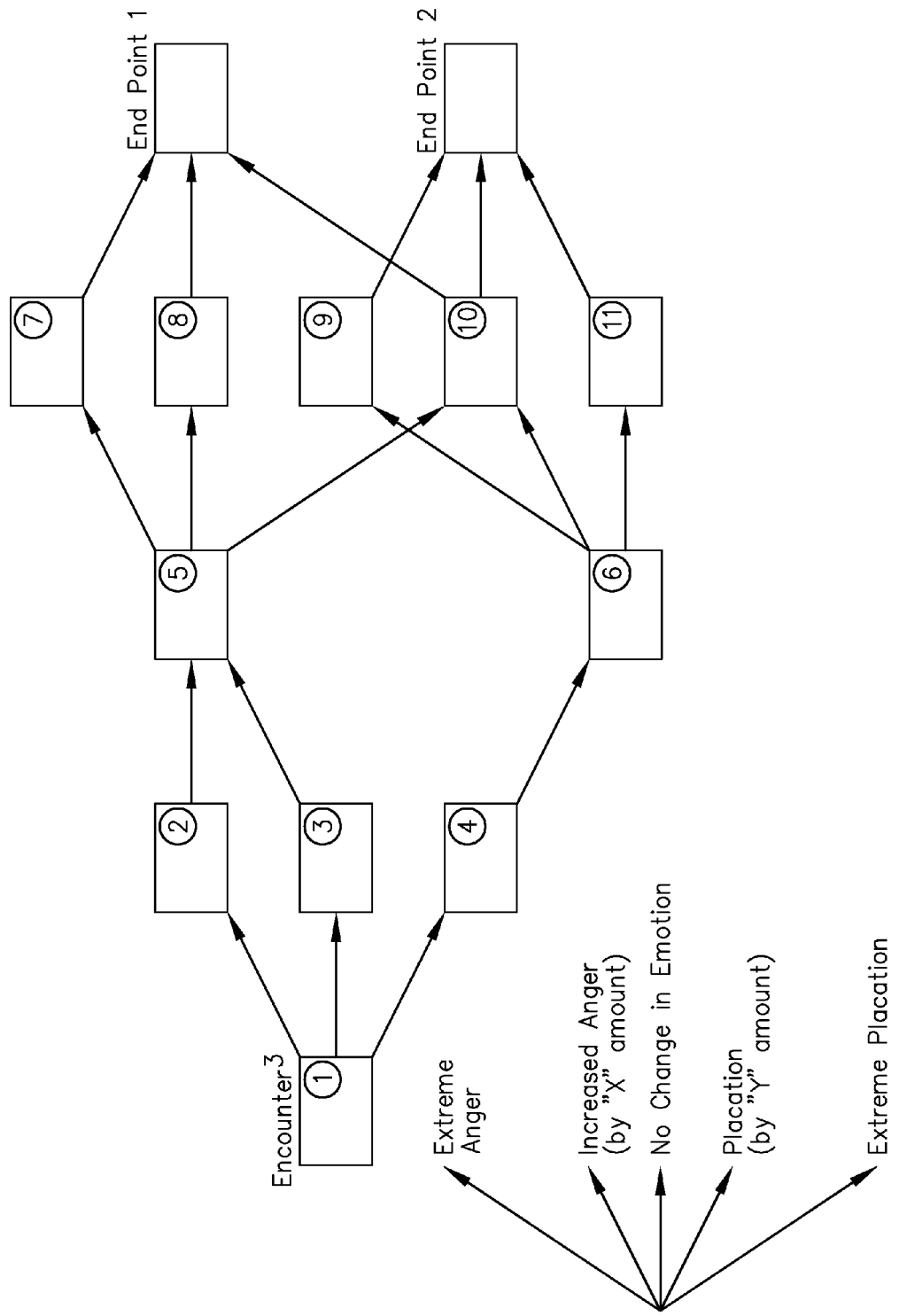
FIG. 5; illustrates a third simplified diagram of a dialog encounter between at least two game characters in a video game using my novel method and input device, wherein the emotions of anger and placation dictate the direction of the single pass-through dialog, but along multiple pathways to at least two end points.

Referring to FIG. 5, yet another example of a simplified flow diagram wherein an Encounter$^3$ is played out. In Encounter$^3$, the details of the exact outcomes at each end point will again not be followed through like that of FIG. 3, as it evident as to the previous explanations on how the dialog vignettes play-out. However, it should be noted that FIG. 5 (Encounter$^3$) allows for an extreme placation move (vignette block 5 to 10) to allow someone the possibility to reduce the confrontation by some great threshold value and encourage a more peaceful outcome through dialog and intellect, even though by doing so, the game player does not know that such extreme placation will "defuse" the situation. As can be seen in FIG. 5, once the player character reaches vignette block 10, extreme anger still can be used if it appears that extreme placation did not diffuse the situation in a way that the player wanted it to. But again, the game player is unaware if such action will provide him a certain result, since searching for results (i.e., meta-gaming) is not encouraged in the present invention having the single pass-through dialog sequencing employed herein.

Figure 6:
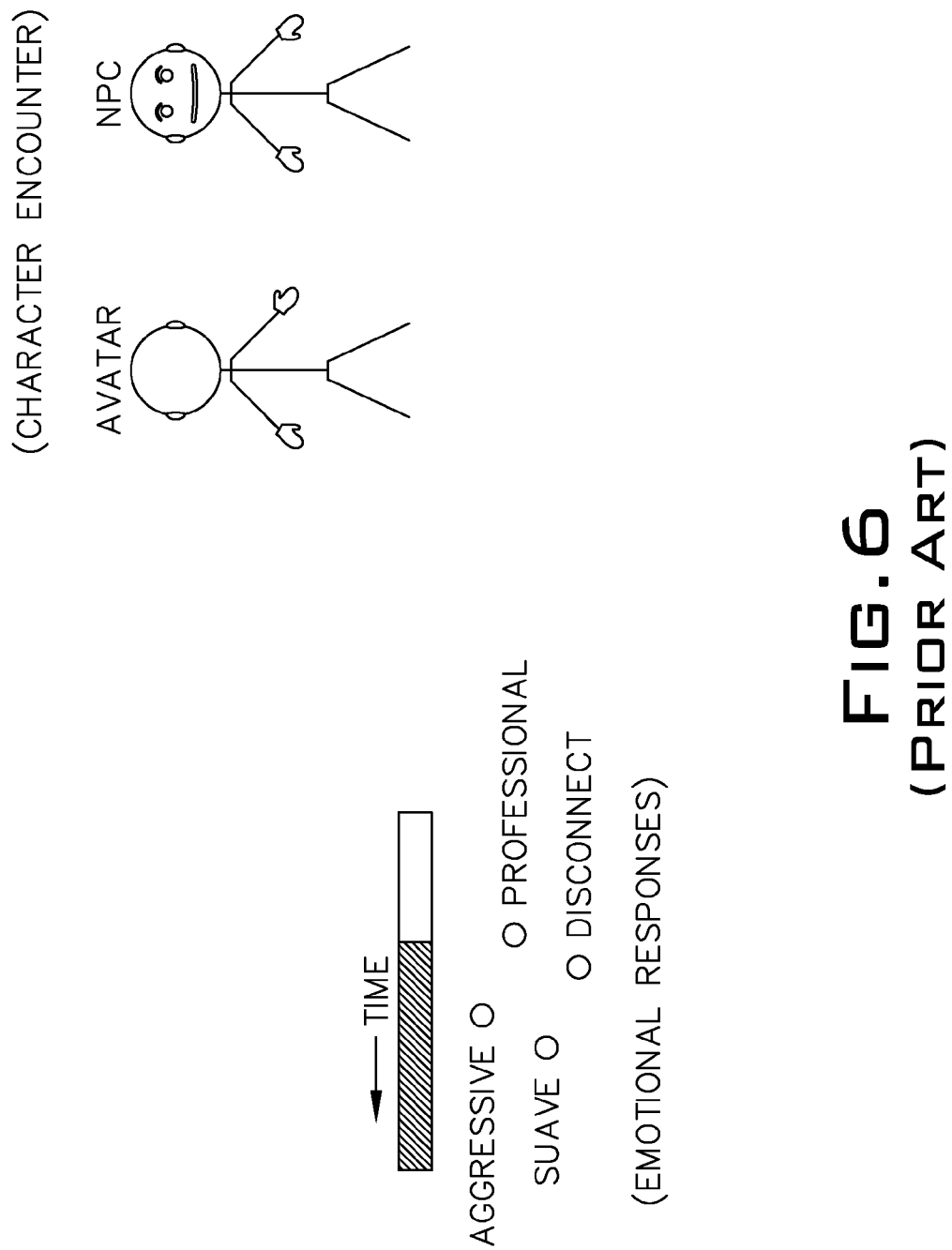
FIG. 6 illustrates a prior art video game dialog encounter based upon a dialog tree, but wherein, instead of actual word responses being provided for choosing therefrom, graphical illustrations of emotional responses are provided that are based upon pre-programmed choices affiliated with a "handler" of the avatar, who was chosen at the beginning of the video game.

Referring to FIG. 6, a prior art video game character encounter with dialog is illustrated. In such encounter an avatar has encountered an NPC, who may be one of many different characters in which a dialog is programmed to occur there between and wherein a traditional dialog tree is used, but represented by emotions instead of actual sentence or word choices displayed across a video screen. This is distinguishable from the present invention wherein actual and real life emotions such as anger and placation, by way of example, of two opposed emotions, can be introduced into character dialog to make it a more fluid activity of the game and to allow the emotions of the game player to have a larger outcome of said dialog. This then operates to keep the game player affixed within the drama of the overall game and in each particular dialog encounter as they occur, thereby maintaining and increasing game momentum. This makes the game player more realistically feel the emotion of the video game by making the drama the reward, prize or fun of the game. My method and device of the present invention is also distinguishable from that which is seen in FIG. 6, because it directs the game player away from meta-gaming by keeping him focused on each encounter through the use of his emotions and not focused on a list of predefined responses, albeit in FIG. 6 they are represented by one word emotional states, which are preprogrammed by the game developer. The prior art game of FIG. 6 encourages meta-gaming, its dialog is developed with a dialog tree, whereby looping can be practiced. This game does not employ single pass-through dialog encounters, such as my present invention.

Figure 7:
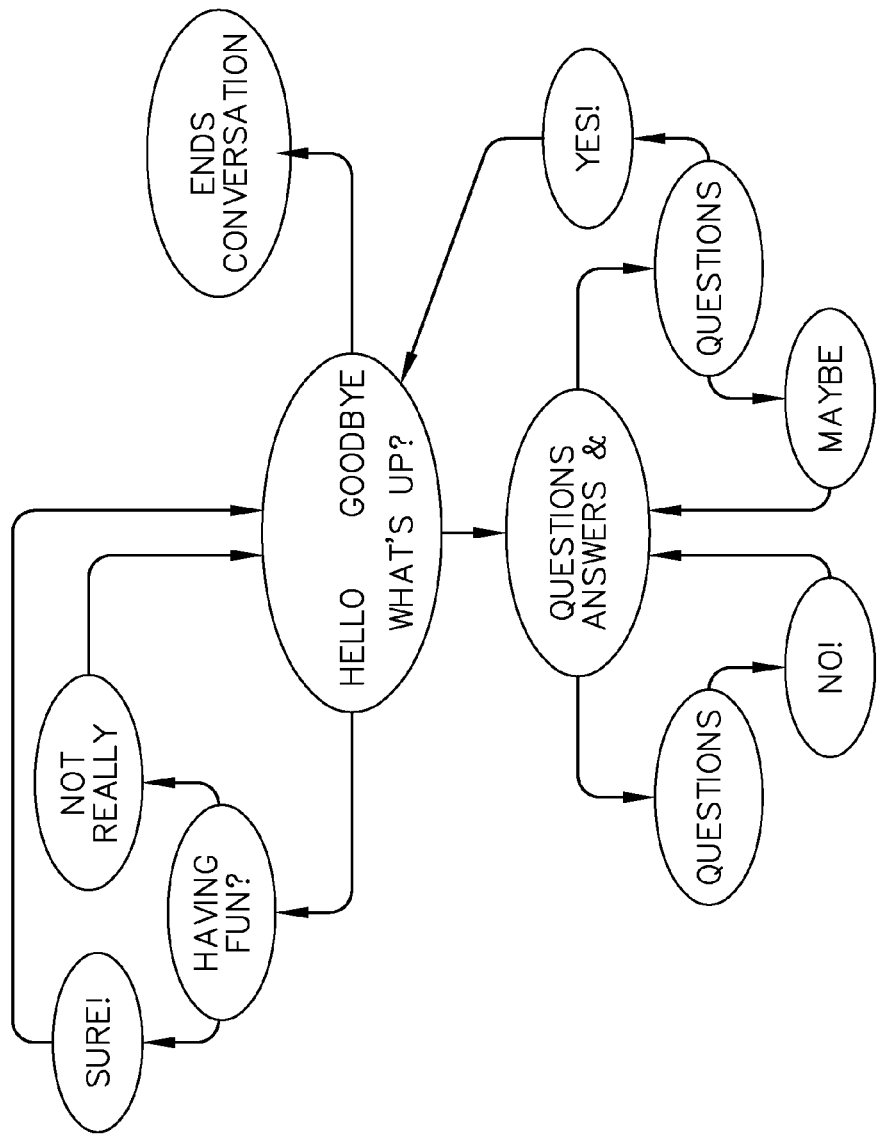
FIG. 7 illustrates a typical prior art dialog tree that does is based upon looping.

Referring to FIG. 7, a typical dialog tree is shown, which is employed in typical prior art video game character dialog. As shown therein, the dialog tree is circular in nature (a loop) and only leads to one end point or "End Conversation." This feature encourages meta-gaming. As further depicted underneath "Questions & Answers," a minimum number of choices are provided to an avatar and he can choose each one, see where it leads him and then return to the same spot and "try again" to see where the other path leads him if he chooses one of the other limited, pre-programmed choices. This is clearly distinguishable from my invention (which will be more fully described herein below) in that once an emotion is inputted on the controller device the avatar must follow the pathway that directs him and he is unable to circle back around and see where another pathway may have lead him if he chooses a different emotional value. My method and device direct the game player's avatar into single pass-through dialog scenarios.

Figure 8:
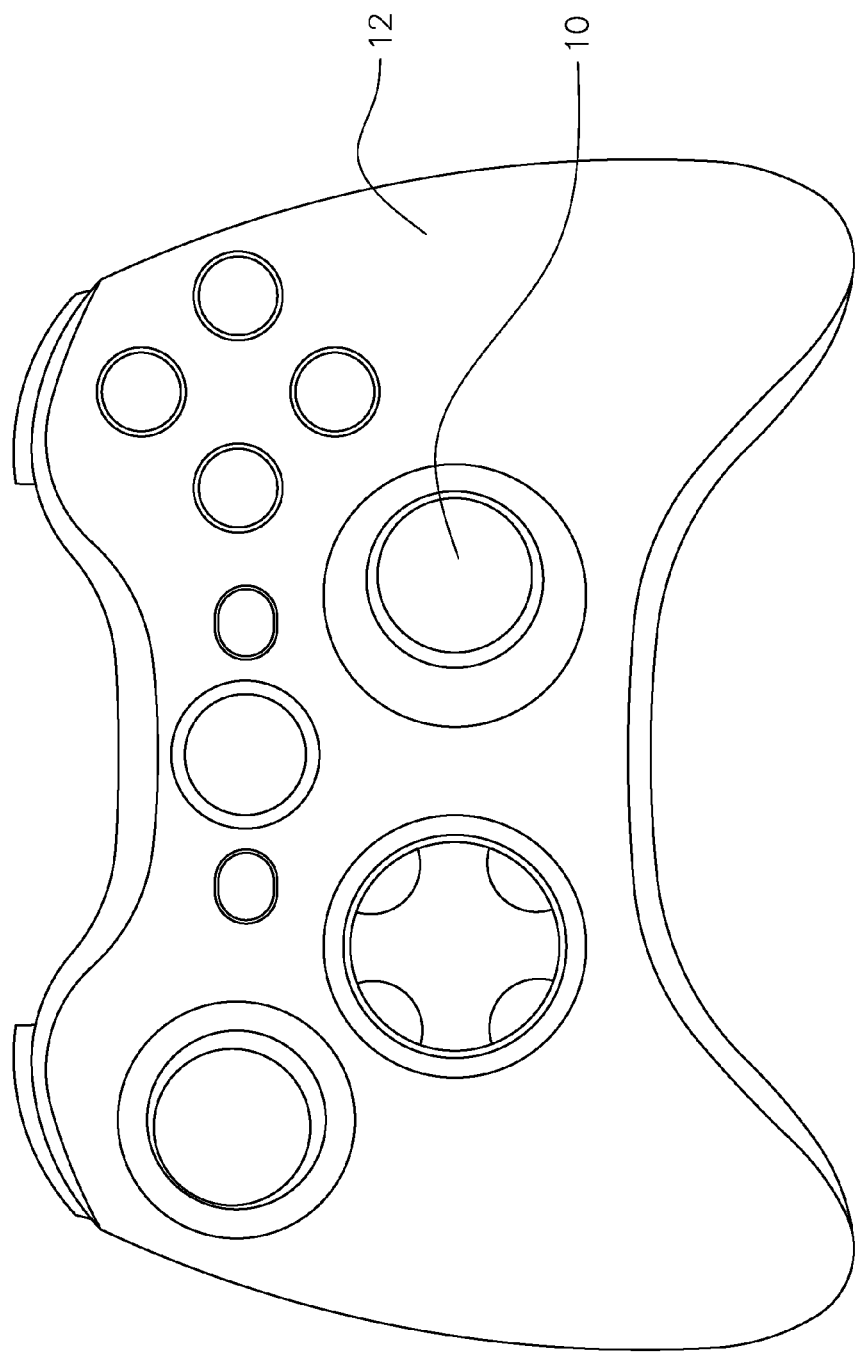
FIG. 8 illustrates a computing input device or video game controller, which can be used with my novel method to introduce emotion into character dialog between a game player's character and any other character.
Figure 9:
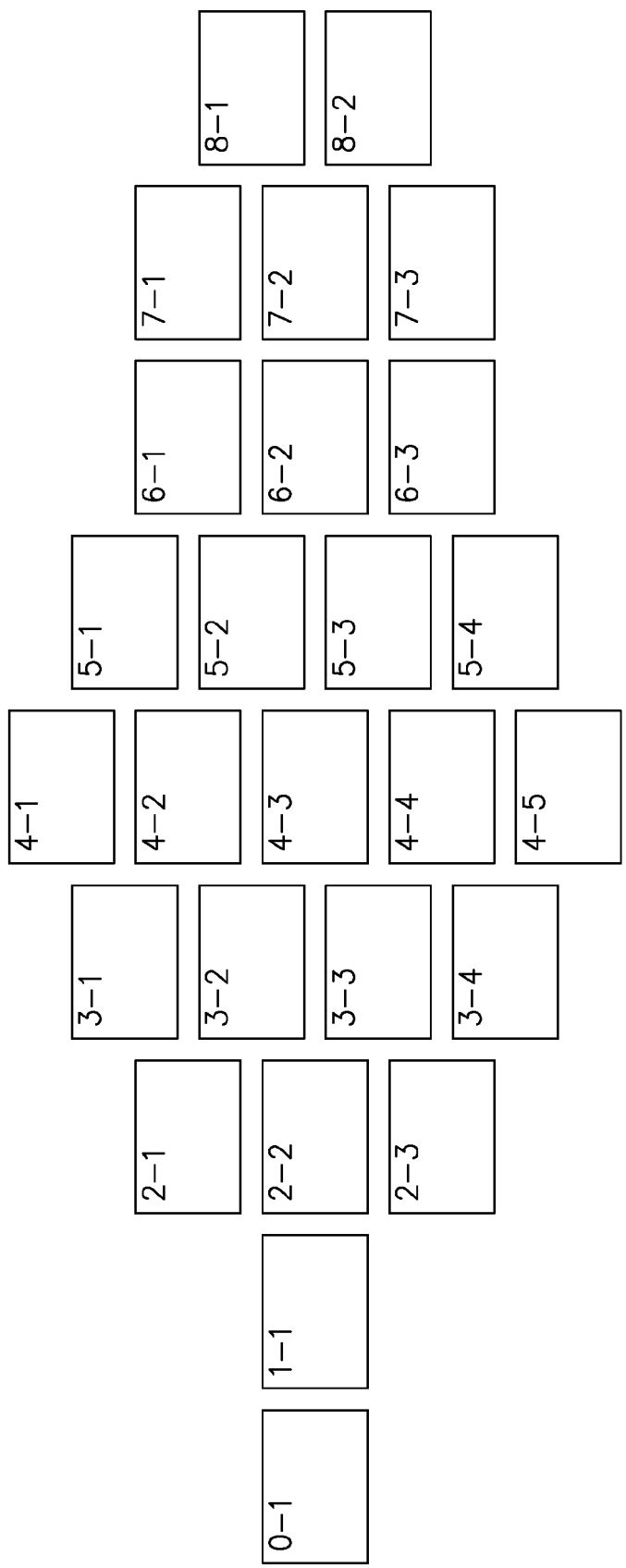
FIG. 9 illustrates a set of cards of a dialog vignette of the present method, having eight columns, representing the flow of dialog from left to right and illustrating the abundance of dialog pathways that can be realized based solely upon the game player's input of emotion in any specific dialog card through the use of the computing input device, but which is a single-pass through dialog.
Figure 9A:
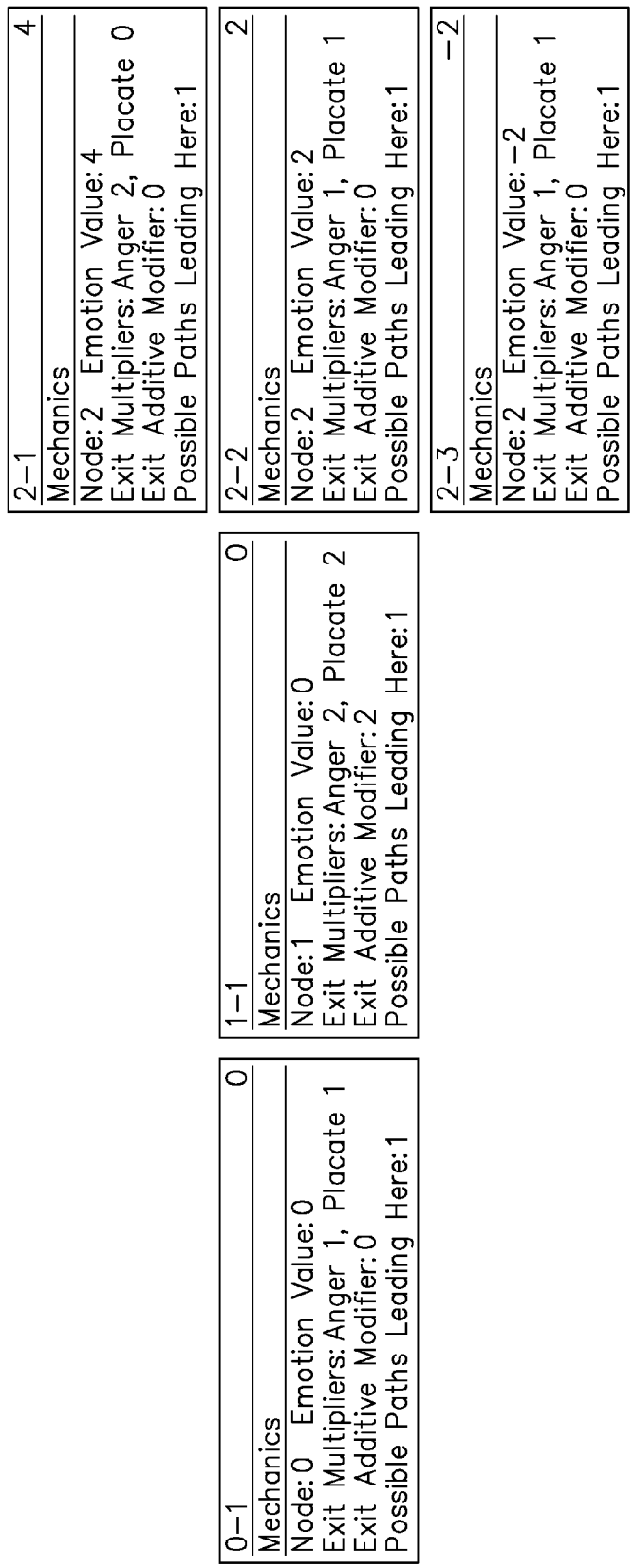
FIG. 9A illustrates columns 0 through 2 of FIG. 9 and the values associated of each dialog card having certain mechanic determiners that affect the pathway of the character dialog of the present method based upon an initial input of emotion by the player character using the computing input device.
Figure 9B:
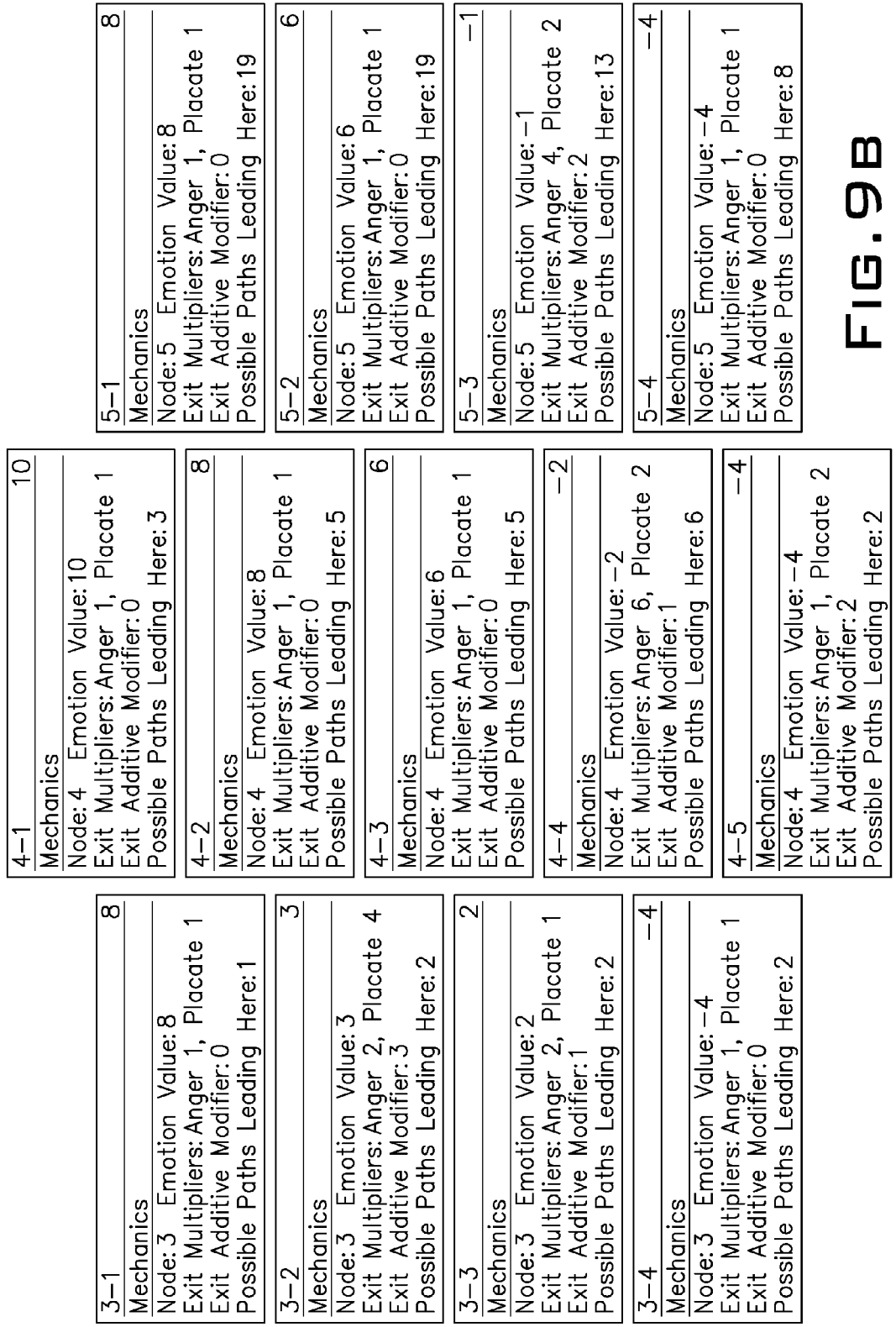
FIG. 9B illustrates columns 3 through 5 of FIG. 9 and the values associated of each dialog card having certain mechanic determiners that affect the pathway of the character dialog of the present method based upon an initial input of emotion by the player character using the computing input device.

Referring now to FIG. 8, a typical game console controller 12 is shown having at least joystick 10. As can be seen though, there are a plurality of other buttons available, which can be used in the method and device of the present invention. For instance, if joystick 10 is used to input an emotion (pushing forward along vertical x axis for anger for a positive numerical value like 0.5, 1.0, 2.0 or by pulling backwards along vertical x axis for placation for negative numerical value of −1.0, −1.5 or −2.0, to name just a few), then any of the other buttons can be programmed to "lock-in" the value of emotion so as to hold it there for a desired period of time chosen by the player, or for clearing an aggregate emotion value (or score) that has either accumulated during one given player character dialog sequence or one that has accumulated for a length of time in the video game so far, to name just a few examples. Nothing herein limits the use of any other of the buttons found on a typical game controller 12. Further, game controller 12 resembles that which is used with the X-Box™. However, nothing herein limits the use of the present method and device with only the X-Box™, as it can be used with any of the well known gaming consoles, such as the Playstation 3™ and the Nintendo Wii™ or one of the other lesser known gaming consoles. Further, the present invention can be employed to operate on a standard PC or MAC™ or other like computing device or on-line in a MMORPG (or "Massively Multiplayer Online Role-Playing Game"). Further, nothing herein limits that the computing input device be a game console or any of the other aforementioned devices. The inputting of emotion or even mood can be done by other sources such as light or audio devices or could be imparted with the use of the newly advancing 3-D skeletal body movement reading devices such as that which is being released by Microsoft™ for their X-Box™, which is currently called "Project Natal™." These devices, which are also being developed by other companies, are called Natural User Interface (NUI) and can be used with my method of the present invention and be the device that inputs the desired emotion. Referring now to FIGS. 9-9C, a simple, but preferred, single pass-through dialog sequence used in the present invention is shown. It is first noted that nothing herein limits any dialog sequence used in the present invention from being formed from only eight columns and having a maximum number of dialog cards in any given column to be five, as shown in FIGS. 9-9C. This has been done (and is carried throughout in FIGS. 10-12C) for the purposes of illustration only. Referring to FIGS. 9A-9C, the mechanics of each dialog card of this particular dialog encounter are shown. These mechanics include Node position and column designation (top left hand corner), card emotion value (top right hand corner), Exit Multipliers (Anger and Placate), Exit Additive Modifier as well as an indicator of the possible pathways leading from each card from the multitude of single pass-through dialog sequences, all predicated upon the player inputted emotion from the computing input device. The exact pathway that will be taken, which is unknown to the game player and therefore the player character, is determined by a "New Emotion Score" at each dialog card of the dialog sequence, which is a result of the game player's introduced emotion (i.e., anger or placation). However, unlike other prior art video games that permit meta-gaming, the introduction of emotion by the player character will not present him with an idea of where he is exactly going or more importantly, where does the programmer want him to go. Instead, his true, real-life emotion input will dictate the start and then the continuing pathway of the dialog (a single pass-through sequence) and thereby make it an integral component of the game being played, which maintains the desired momentum.

Figure 10:
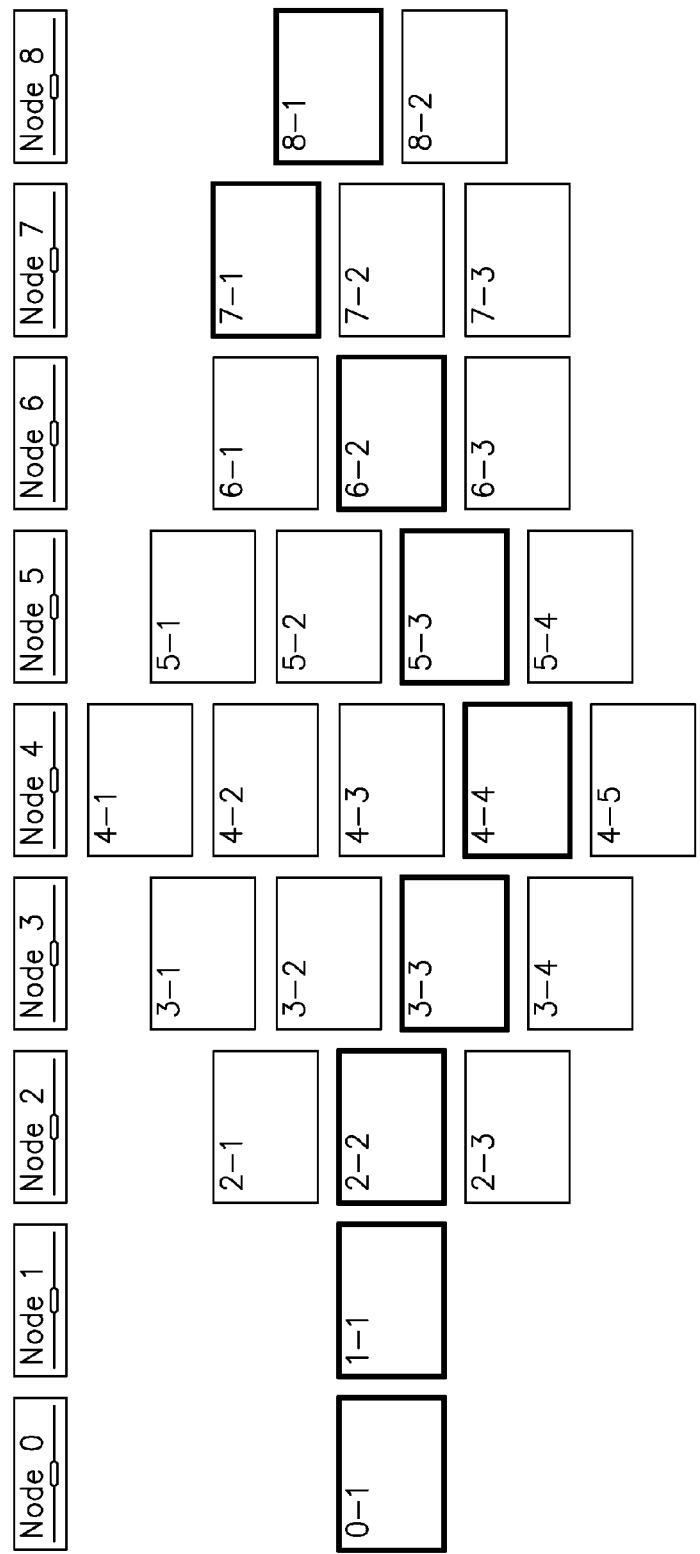
FIG. 10 illustrates a first set of cards of a dialog vignette of the present method, wherein the flow of dialog is highlighted from left to right and having a specific pathway, which is realized based upon the game player's input of emotion by use of the computing input device in each subsequent dialog card while the character dialog unfolds.
Figure 10A:
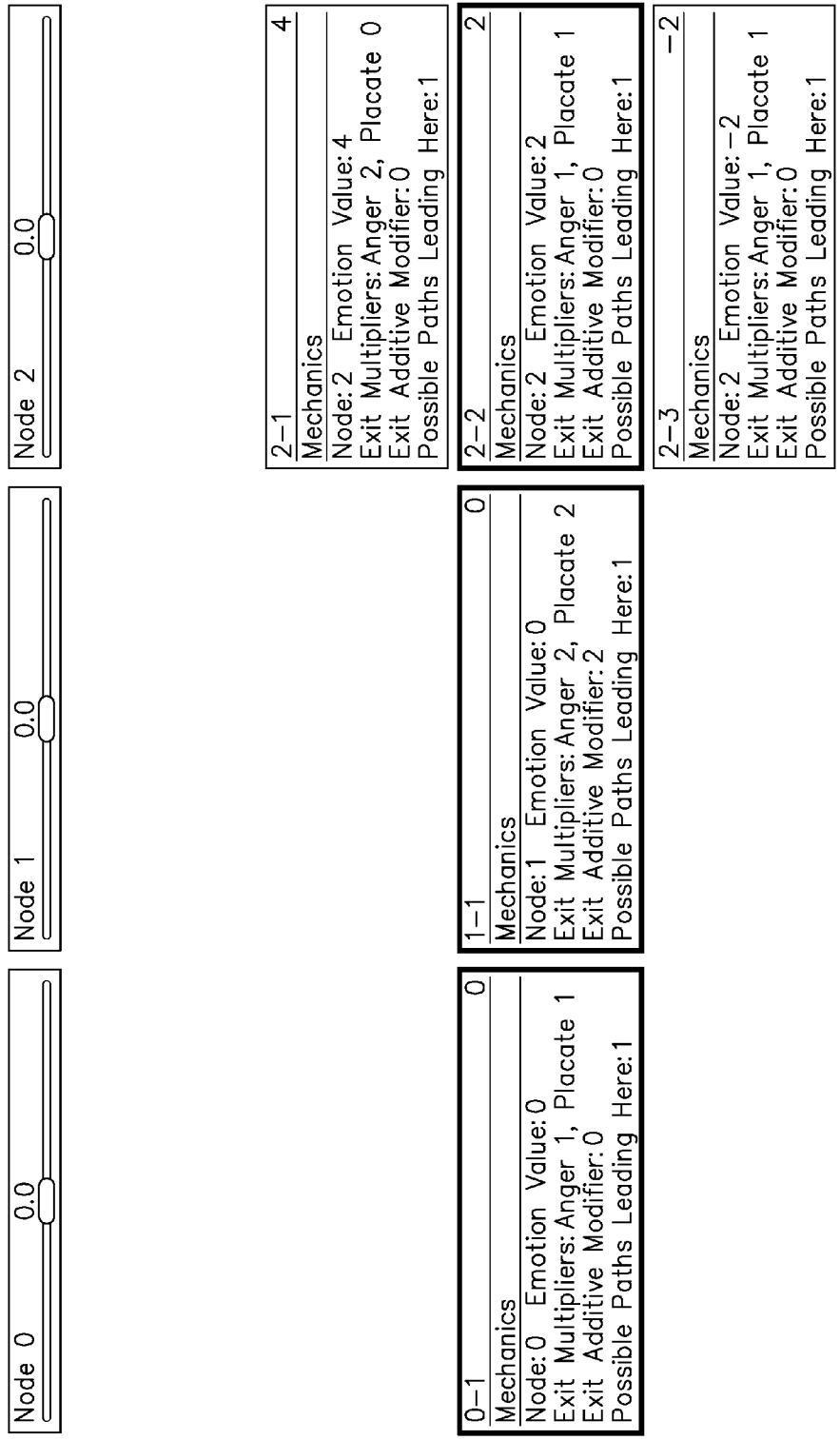
FIG. 10A illustrates columns 0 through 2 of FIG. 10 and the values associated of each dialog card having certain mechanic determiners that affect the pathway of the character dialog of the present method based upon an initial emotion value input of 0 in each card by the player character using the computing input device.
Figure 10B:
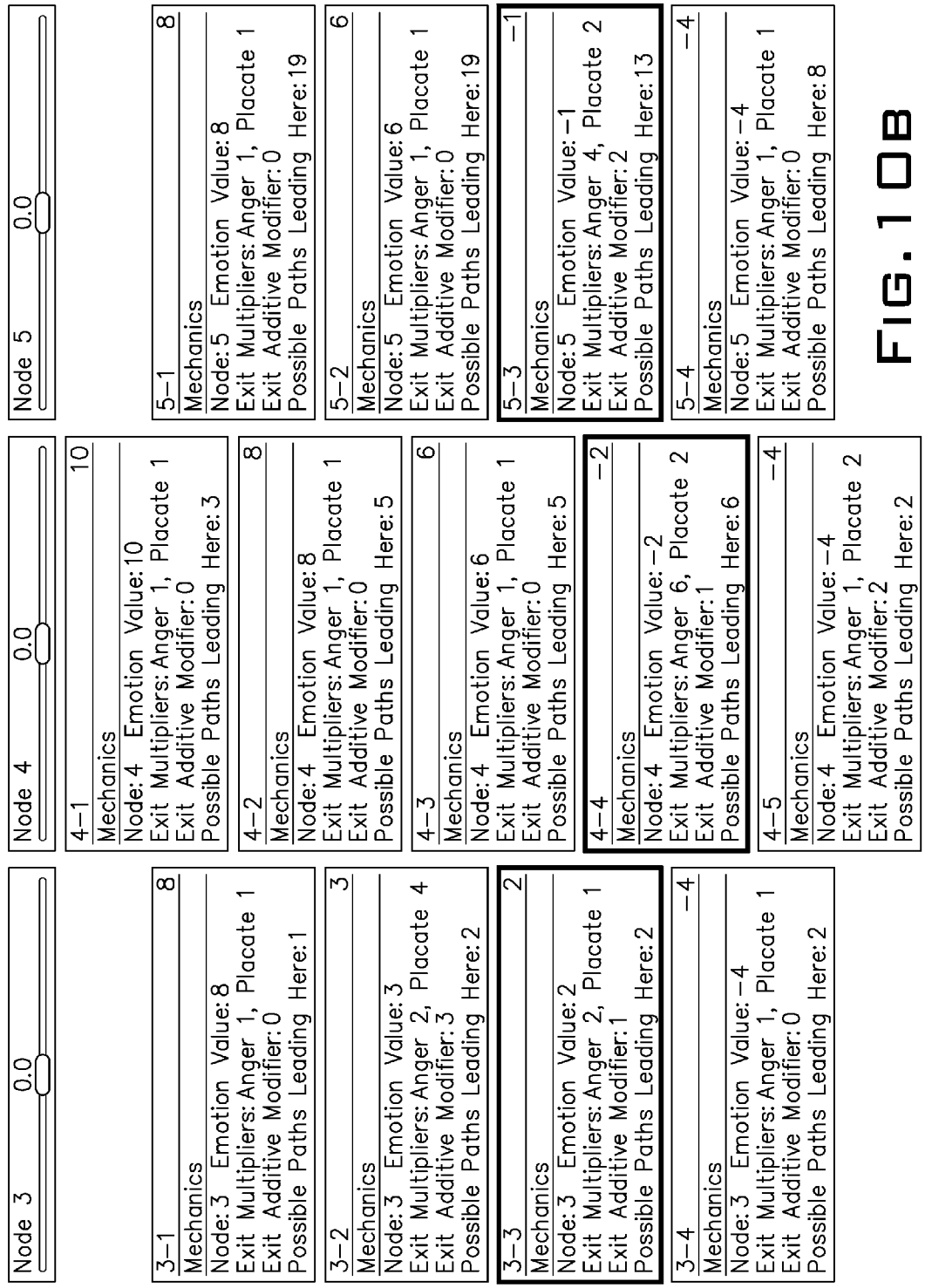
FIG. 10B illustrates columns 3 through 5 of FIG. 10 and the values associated of each dialog card having certain mechanic determiners that affect the pathway of the character dialog of the present method based upon an initial emotion value input of 0 in each card by the player character using the computing input device.
Figure 10C:
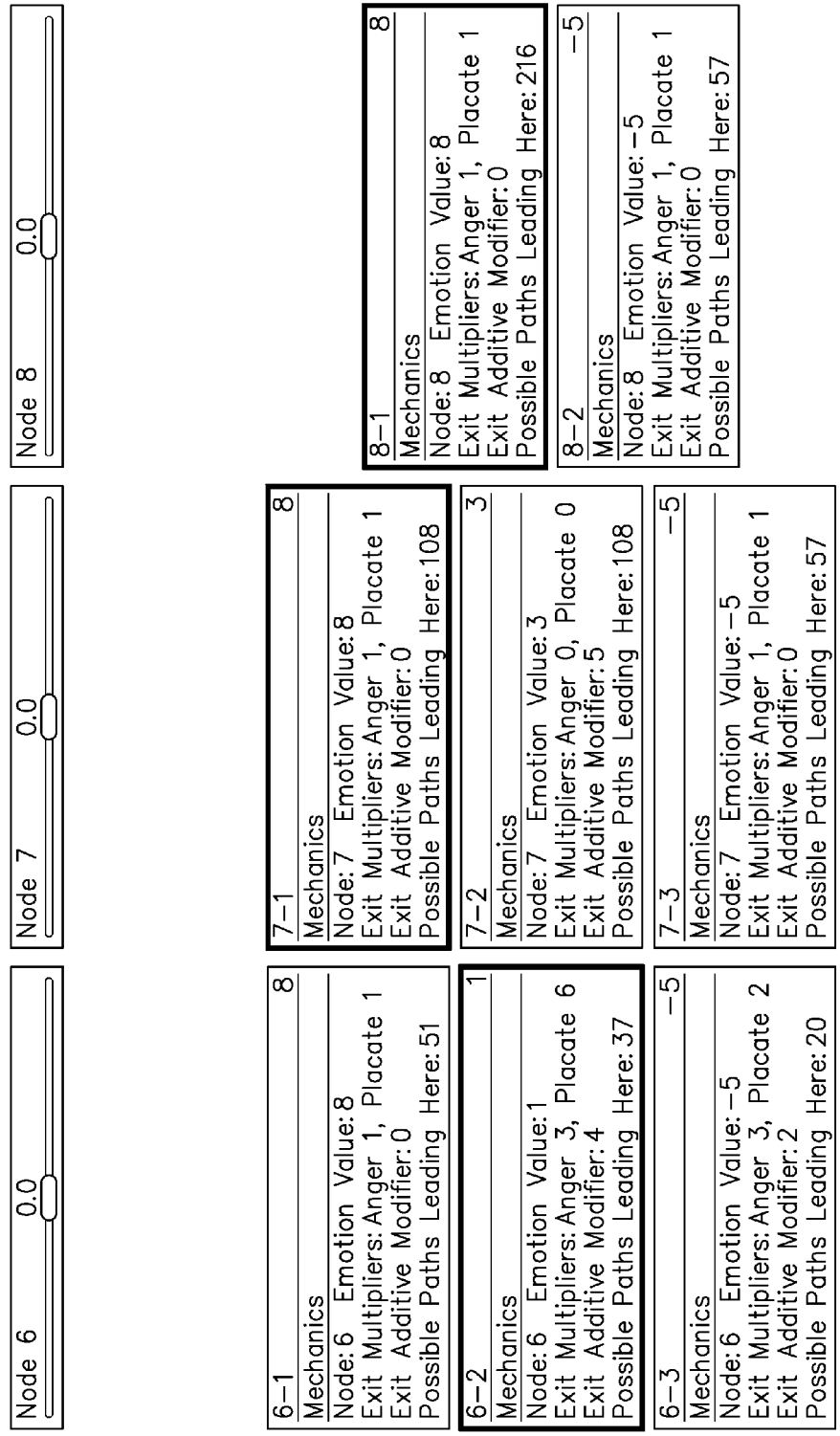
FIG. 10C illustrates columns 6 through 8 of FIG. 10 and the values associated of each dialog card having certain mechanic determiners that affect the pathway of the character dialog of the present method based upon an initial emotion value input of 0 in each card by the player character using the computing input device.

Referring now to FIGS. 10-10C, the same dialog as that which is shown in FIGS. 9-9C is shown herein. However, in these figures, emotion values have been inputted at each Node or column (see the row of boxes along the top margins) to illustrate a one of 216 possible different pathways (see FIG. 10C, card 8-1) that could be taken in this particular dialog, wherein are each and every one is a single pass-through dialog sequence. In this example, all neutral, or 0.0 values, have been introduced at each Node. Therefore, with reference to FIG. 10, the dialog sequence can be seen to traverse the following pathway of individual dialog cards 0-1, 1-1, 2-2,

3-3, 4-4, 5-3, 6-2, 7-1 and then finally to 8-1 (as shown by the black border highlights around each respective card).

With specific reference now to FIGS. 10A-10C, the inputting of a 0.0 emotion value at Node 0 (card 0-1) with the computing input device, in combination with the appropriate Multiplier and the Modifier lead this particular dialog sequence to card 1-1. Then at Node 1 (card 1-1), the inputting of a 0.0 emotion value, again in combination with the appropriate Multiplier and the Modifier, lead the dialog sequence to card 2-2. Thereafter, at Node 2 (card 2-2), the inputting of a 0.0 emotion value, in combination with the appropriate Multiplier and the Modifier, lead the dialog sequence to card 3-3. Then at Node 3 (card 3-3), the inputting of a 0.0 emotion value, in combination with the appropriate Multiplier and the Modifier, lead the dialog sequence to card 4-4. Next, at Node 4 (card 4-4), the inputting of a 0.0 emotion value, in combination with the appropriate Multiplier and the Modifier, lead the dialog sequence to card 5-3. Further, at Node 5 (card 5-3), the inputting of a 0.0 emotion value, in combination with the appropriate Multiplier and the Modifier, lead the dialog sequence to card 6-2. Then, at Node 6 (card 6-2), the inputting of a 0.0 emotion value, in combination with the appropriate Multiplier and the Modifier, lead the dialog to card 7-1. Finally, at Node 7 (card 7-1), the inputting of a 0.0 emotion value, in combination with the appropriate Multiplier and the Modifier, lead the dialog sequence to card 8-1, which is an end conversation node. In the preferred embodiment, an emotion value can be entered by the computing input device at Node 8 (or more specifically, the "End Conversation Card"). However, in alternate embodiments, no emotion value is inputted.

Figure 11:
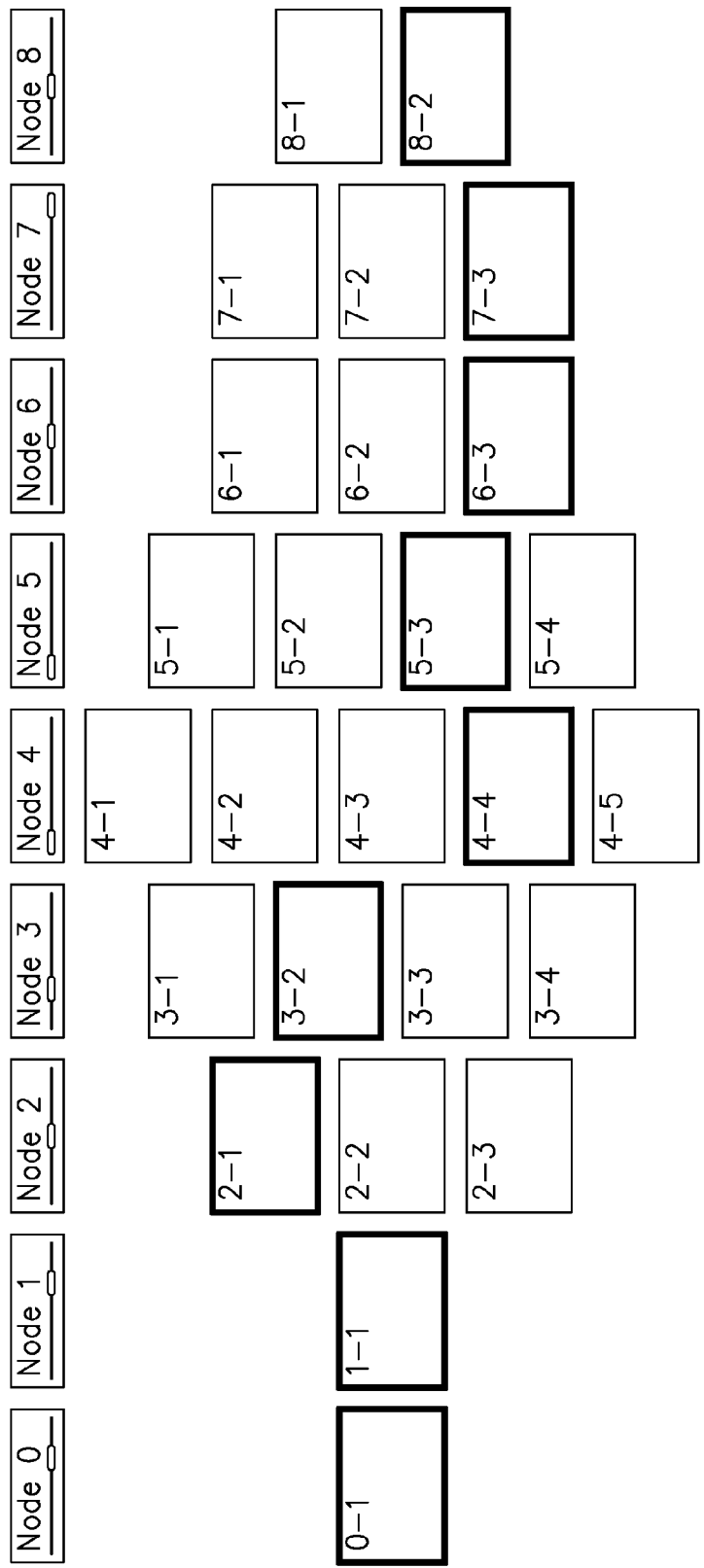
FIG. 11 illustrates a second set of cards of a dialog vignette of the present method, wherein the flow of dialog is highlighted from left to right and having a specific pathway, which is realized based upon the game player's input of emotion by use of the computing input device in each subsequent dialog card while the character dialog unfolds.
Figure 11A:
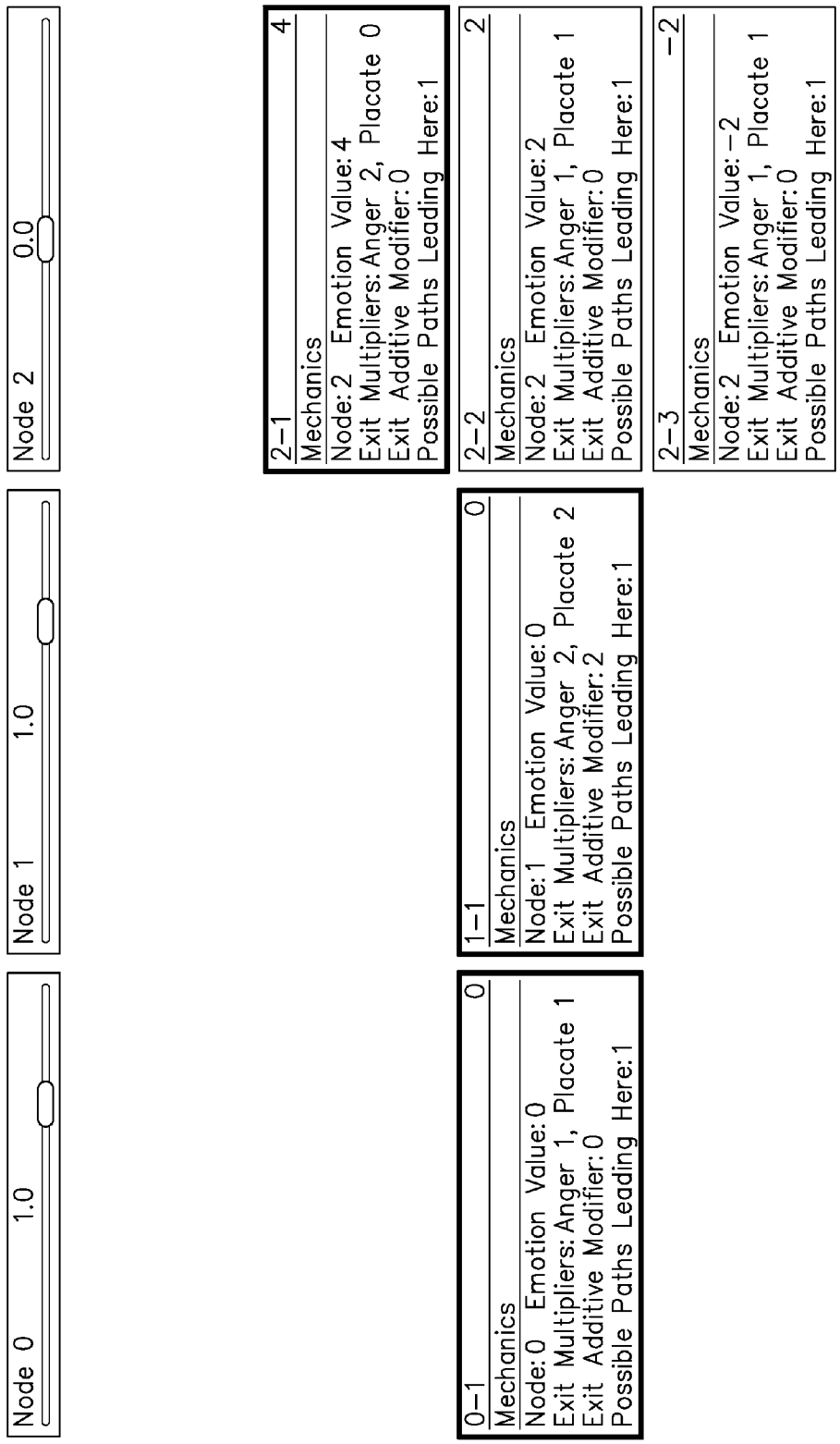
FIG. 11A illustrates columns 0 through 2 of FIG. 11 and the values associated of each dialog card having certain mechanic determiners that affect the pathway of the character dialog of the present method based upon an initial emotion value input of 1.0, 1.0 and 0, respectively, in each subsequent card by the player character using the computing input device.
Figure 11B:
FIG. 11B illustrates columns 3 through 5 of FIG. 11 and the values associated of each dialog card having certain mechanic determiners that affect the pathway of the character dialog of the present method based upon an initial emotion value input of −1.0, −2.0 and −2.0, respectively, in each subsequent card by the player character using the computing input device.
Figure 11C:
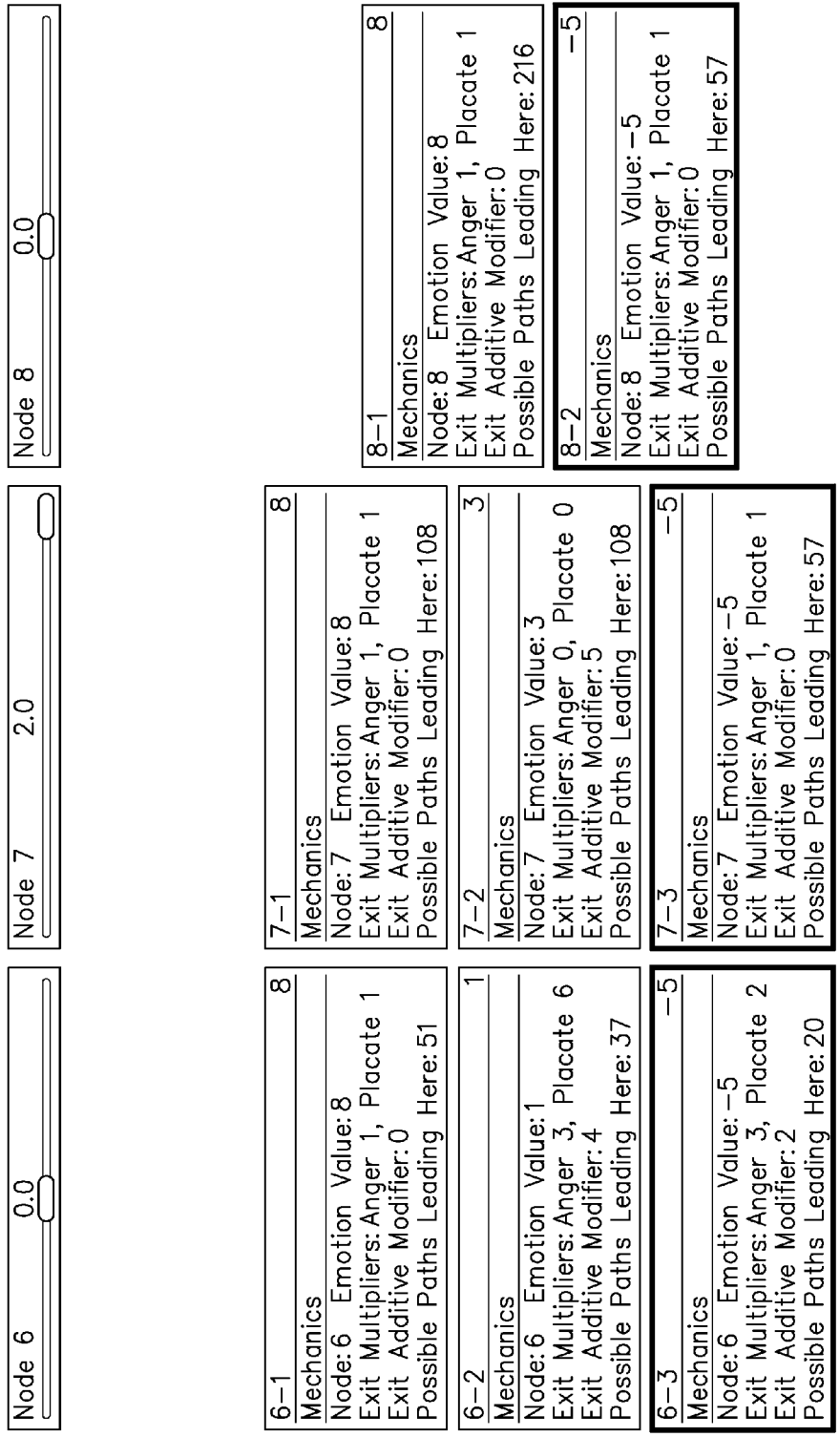
FIG. 11C illustrates columns 6 through 8 of FIG. 11 and the values associated of each dialog card having certain mechanic determiners that affect the pathway of the character dialog of the present method based upon an initial emotion value input of 0.0, 2.0 and 0.0, respectively, in each subsequent card by the player character using the computing input device.

Referring now to FIGS. 11-11C, the same dialog as that which is shown in FIGS. 9-9C is shown herein. However, in these figures, as was done in FIGS. 10-10C, emotion values have been inputted at each Node to illustrate a second of 216 possible different single pass-through dialog pathways that could be taken in this particular dialog encounter. In this example, various emotion input values are introduced by way of the computing input device. So, with reference first to FIG. 11, the dialog sequence can be seen to traverse the following pathway of dialog cards 0-1, 1-1, 2-1, 3-2, 4-4, 5-3, 6-3, 7-3 and then finally to 8-2 (as shown by the black border highlights around each respective card).

With specific reference now to FIGS. 11A-11C, the inputting of a 1.0 anger emotion value at Node 0 (card 0-1), in combination with the appropriate Multiplier and the Modifier lead the dialog sequence to card 1-1. Then at Node 1 (card 1-1), the inputting of another 1.0 anger emotion value, again in combination with the appropriate Multiplier and the Modifier, lead the dialog sequence to card 2-1. Thereafter, at Node 2 (card 2-1), the inputting of a 0.0 emotion value, in combination with the appropriate Multiplier and the Modifier, lead the dialog sequence to card 3-2. Then at Node 3 (card 3-2), the inputting of a −1.0 placate emotion value, in combination with the appropriate Multiplier and the Modifier, lead the dialog sequence to card 4-4. Next, at Node 4 (card 4-4), the inputting of a −2.0 placate emotion value, in combination with the appropriate Multiplier and the Modifier, lead the dialog sequence to card 5-3. Further, at Node 5 (card 5-3), the inputting of another −2.0 placate emotion value, in combination with the appropriate Multiplier and the Modifier, lead the dialog sequence to card 6-3. Then, at Node 6 (card 6-3), the inputting of a 0.0 emotion value, in combination with the appropriate Multiplier and the Modifier, lead the dialog sequence to card 7-3. Finally, at Node 7 (card 7-3), the inputting of a 2.0 anger emotion value, in combination with the appropriate Multiplier and the Modifier, lead the dialog sequence to card 8-2, which is an end conversation node. Again, in the preferred embodiment, any emotion value can be entered by the player character by using the computing input device at Node 8 of the dialog (or more specifically, the "End Conversation Card"). However, in alternate embodiments, no emotion input value is necessary.

Figure 12:
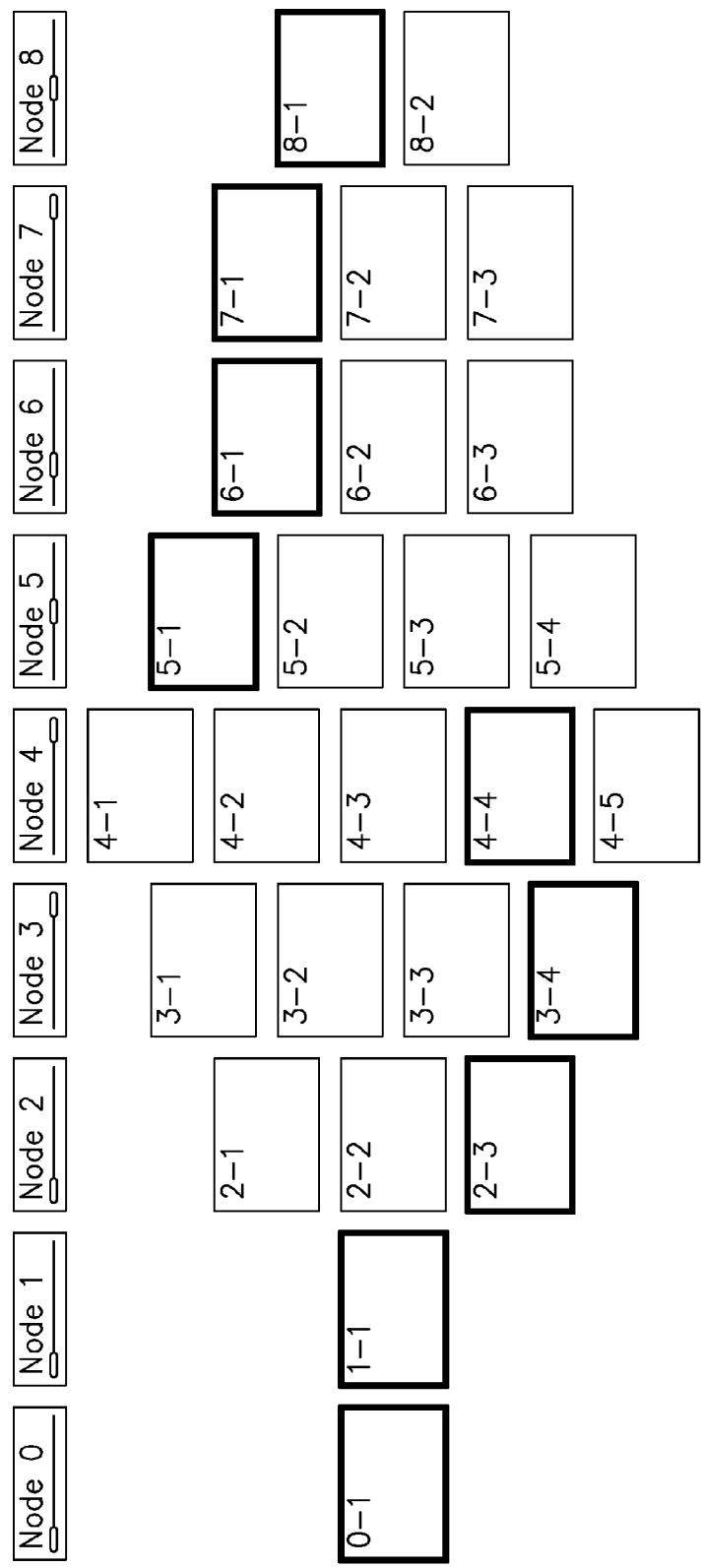
FIG. 12 illustrates a third set of cards of a dialog vignette of the present method, wherein the flow of dialog is highlighted from left to right and having a specific pathway, which is realized based upon the game player's input of emotion by use of the computing input device in each subsequent dialog card while the character dialog unfolds.
Figure 12A:
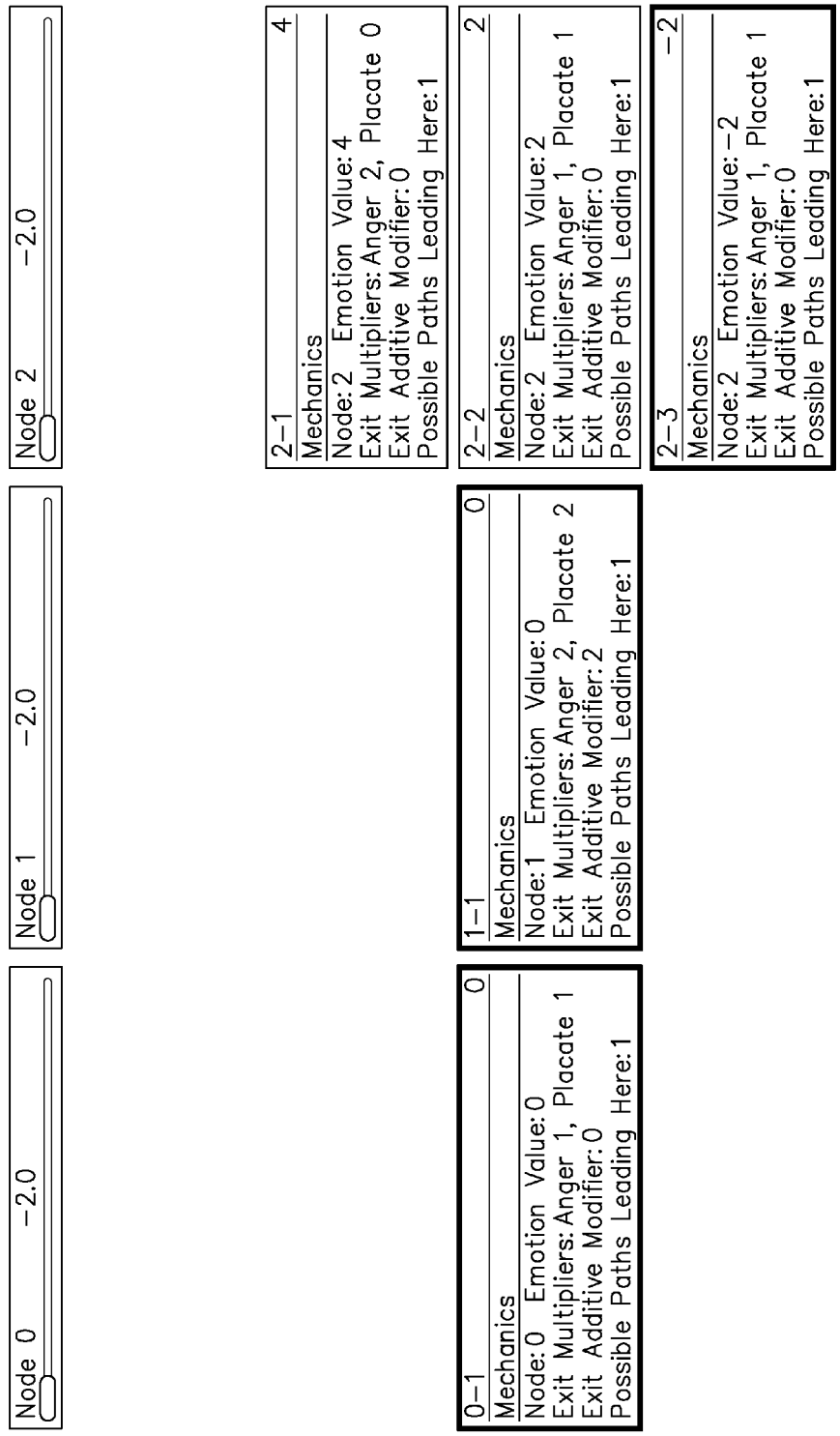
FIG. 12A illustrates columns 0 through 2 of FIG. 12 and the values associated of each dialog card having certain mechanic determiners that affect the pathway of the character dialog of the present method based upon an initial emotion value input of −2.0, −2.0 and −2.0, respectively, in each subsequent card by the player character using the computing input device.
Figure 12B:
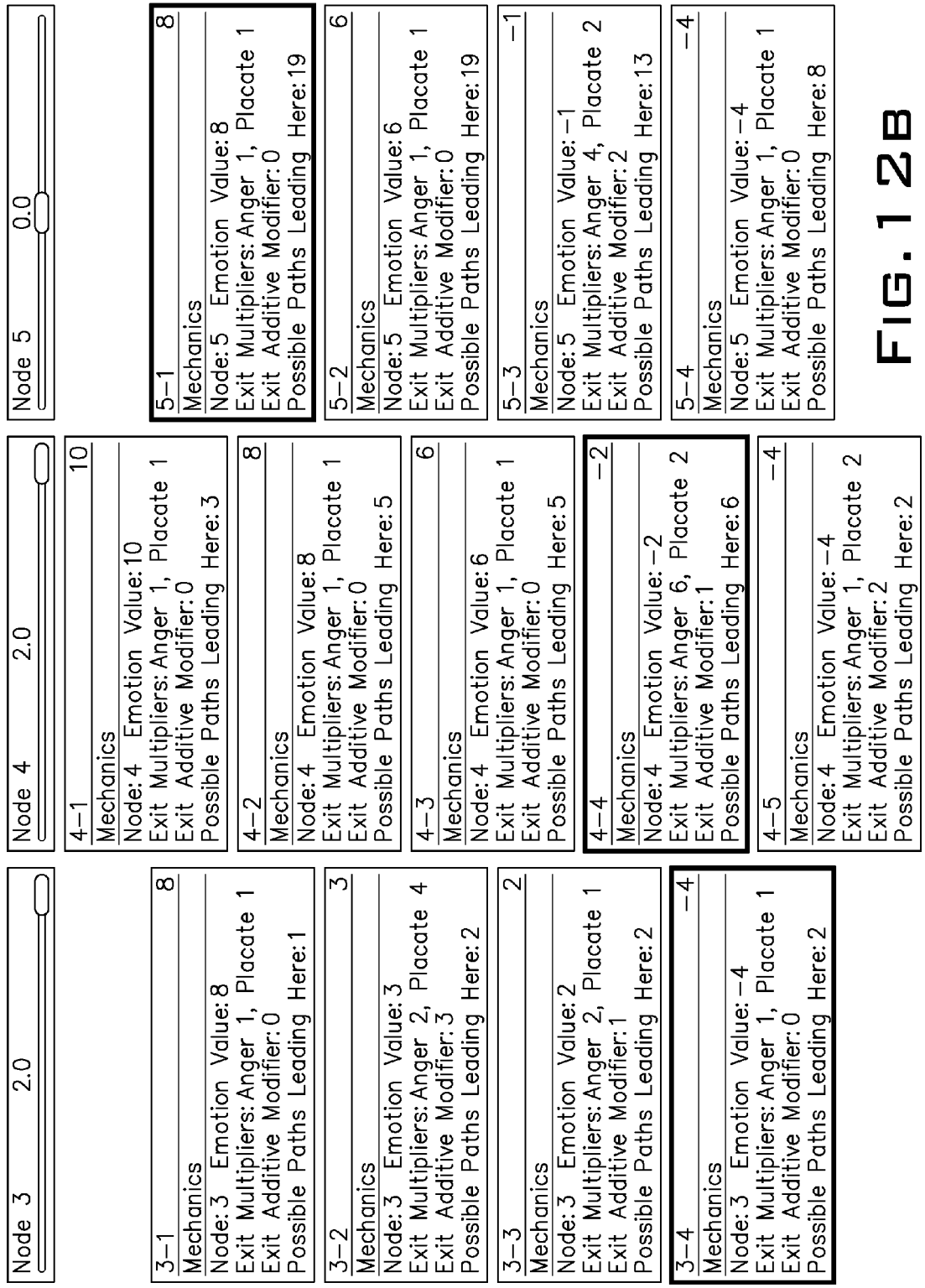
FIG. 12B illustrates columns 3 through 5 of FIG. 12 and the values associated of each dialog card having certain mechanic determiners that affect the pathway of the character dialog of the present method based upon an initial emotion value input of 2.0, 2.0 and 0.0, respectively, in each subsequent card by the player character using the computing input device.
Figure 12C:
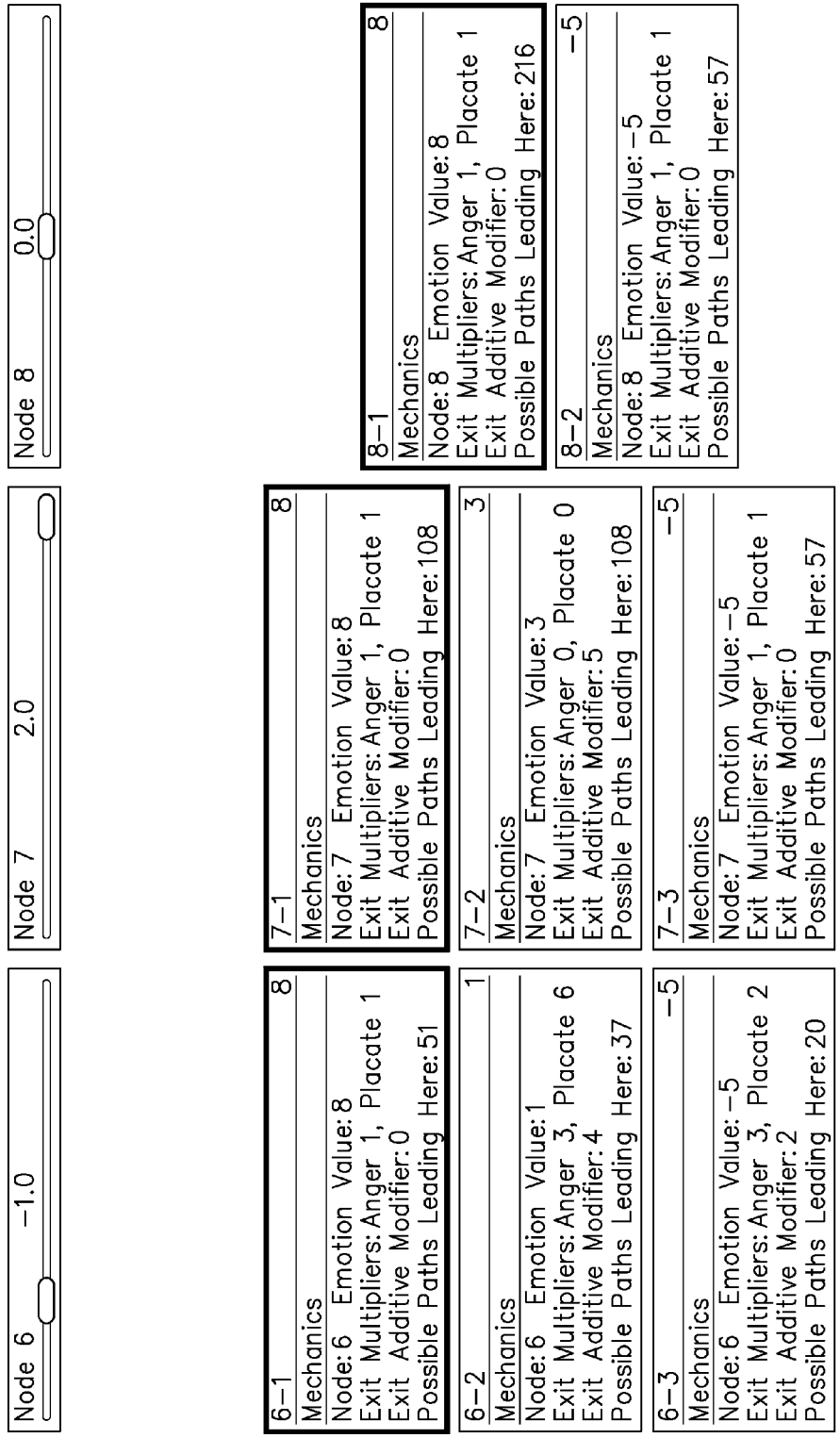
FIG. 12C illustrates columns 6 through 8 of FIG. 12 and the values associated of each dialog card having certain mechanic determiners that affect the pathway of the character dialog of the present method based upon an initial emotion value input of −1.0, 2.0 and 0.0, respectively, in each subsequent card by the player character using the computing input device.

Referring now to FIGS. 12-12C, the same dialog as that which is shown in FIGS. 9-9C is shown herein. However, in these figures, as was done in FIGS. 10-10C and 11-11C, emotion values have been inputted at each Node by the computing input device to illustrate a third of 216 possible different single pass-through dialog pathways that could be taken in this particular dialog. So, with reference first to FIG. 12, the dialog sequence can be seen to traverse the following pathway of dialog cards 0-1, 1-1, 2-3, 3-4, 4-4, 5-1, 6-1, 7-1 and then finally to 8-1 (as shown by the black border highlights around each respective card).

With specific reference to FIGS. 11A-11C, the inputting of a −2.0 placate emotion value at Node 0 (card 0-1), in combination with the appropriate Multiplier and the Modifier lead the dialog sequence to card 1-1. Then at Node 1 (card 1-1), the inputting of another −2.0 placate emotion value, again in combination with the appropriate Multiplier and the Modifier, lead the dialog sequence to card 2-3. Thereafter, at Node 2 (card 2-3), the inputting of yet another −2.0 placate emotion value, in combination with the appropriate Multiplier and the Modifier, lead the dialog sequence to card 3-4. Then at Node 3 (card 3-4), the inputting of a 2.0 anger emotion value, in combination with the appropriate Multiplier and the Modifier, lead the dialog sequence to card 4-4. Next, at Node 4 (card 4-4), the inputting of another 2.0 anger emotion value, in combination with the appropriate Multiplier and the Modifier, lead the dialog sequence to card 5-1. Further, at Node 5 (card 5-1), the inputting of a 0.0 emotion value, in combination with the appropriate Multiplier and the Modifier, lead the dialog sequence to card 6-1. Then, at Node 6 (card 6-1), the inputting of a −1.0 placate emotion value, in combination with the appropriate Multiplier and the Modifier, lead the dialog sequence to card 7-1. Finally, at Node 7 (card 7-1), the inputting of a 2.0 anger emotion value, in combination with the appropriate Multiplier and the Modifier, lead the dialog sequence to card 8-1, which is an end conversation node. As before, in the preferred embodiment, any emotion value can be entered by a player character by using the computing input device at Node 8 of the dialog (or more specifically, the "End Conversation Card"). However, in alternate embodiments, no emotion input value is required.

Referring now to FIGS. 13A-13H, a series of calculation tables are shown that illustrate the manner in which a "New Emotion Score" is calculated for each card of a dialog vignette (like those seen in FIGS. 10-12), which then determines to which subsequent dialog card the character encounter will next flow after the game player imparts his emotion by way of the computing input device, like the gaming console controller 12 seen in FIG. 8. FIGS. 13A-13H correspond to the dialog sequence of FIGS. 11-11C for illustrative purposes. The calculation tables that would be used to determine the dialog sequence for FIGS. 10-10C and 12-12C would of course be different, even though the multipliers and additive modifiers in each dialog card of each column are the same in all three sets of FIGS. 10-12. However, varying player input at each Node introduced with joystick 10 changes the "New Emotion Score" for each of the dialog sequences seen in FIGS. 10-12 and thereby forges a different pathway (and as stated before, in this example, 216 different pathways). Further, FIGS. 10-12 only show one simple example of a dialog sequence used in the present method and controlled by the device, and therefore the calculations for any other dialog sequence would be completely different. Still even further, a multitude of different pathways are available for the examples of FIGS. 10-12. For instance, (referring back to FIGS. 10-12C) one can see that this particular dialog sequence allows for one pathway leading to cards 0-1, 1-1, 2-1, 2-2, 2-3 and 3-1, two pathways for cards 3-2, 3-3, 3-4 and 4-5, three pathways for card 4-1, five pathways for cards 4-2 and 4-3, six pathways for card 4-4, eight pathways for card 5-4, thirteen pathways for card 5-3, nineteen pathways for cards 5-1 and 5-2, twenty pathways for card 6-3, thirty-seven pathways for card 6-2, fifty-one pathways for card 6-1, fifty-seven pathways for cards 7-3 and 8-2, one hundred and eight pathways for cards 7-1 and 7-2 and two hundred and sixteen possible pathways for card 8-1. Again it is noted that this is a simple dialog sequence, so it is not uncommon to have a more complex dialog sequence wherein the maximum number of possible pathways reaches into the thousands, clearly distinguishing the novel method and device for inputting emotion into a character dialog of a video game of the present invention from those of the prior art using dialog trees, wherein game player emotion, through his avatar and a computing input device, can be imparted into the game to affect the dialog sequence as it moves through a single pass-through sequence of a multitude of possible pathways.

Although not shown in any of three aforementioned examples of FIGS. 10-12, there is a short circuit component that can be built into each and every dialog vignette. The purpose of the short circuit component is to traverse the entire dialog encounter regardless of where the game player's avatar is currently located within such vignette based upon aggregate emotion level (such as anger), which takes him straight out of the dialog encounter. Although many outcomes could be realized, a typical one would be the avatar killing the other character involved in the dialog encounter because his aggregate anger threshold has reached a level wherein the remaining dialog cards will not permit him to placate the encounter to a point to reach one of the "end conversation points." He therefore prematurely exits from the encounter and in the preferred embodiment that exit would entail some form of violent confrontation for the anger emotion exit. The same is true for a placation "short circuit." However, for placation, the threshold has reached a level so low, that no level of imparted anger can raise the avatar up from the place he finds himself and so he prematurely exits the encounter, by sulking away from the other character (for example) and having not gained anything.

With reference to FIG. 13A, the New Emotion Score of Node 0 is calculated by reading the player input of 1.0 (anger) and multiplying it by the Anger Exit Multiplier of 1.0 (the anger multiplier is used since an anger input was introduced), which gives you a value of 1.0. Then, the Exit Additive Modifier of 0.0 is added for an Adjusted Player Input of 1.0. This is then applied to the Previous Emotion Score of 0.0 providing a New Emotion Score of 1.0. Thereafter, looking at FIG. 11A, it is noted if any subsequent card in column 1 has an emotion score of 1.0. None do. Therefore, the dialog card having a value next lowest to the New Emotion Score is used, which in this case is card 1-1. Then, with reference to FIG. 13B, the New Emotion Score of Node 1 is calculated by reading the player input of 1.0 and multiplying it by the Anger Exit Multiplier of 2.0, which gives you a value of 2.0. Then, the Exit Additive Modifier of 2.0 is added for an Adjusted Player Input of 4.0. This is then applied to the Previous Emotion Score of 1.0 providing a New Emotion Score of 5.0. Thereafter, looking at FIG. 11A, it is noted if any subsequent card in column 2 has an emotion score of 5.0. None do. Therefore, the dialog card having a value next lowest to the New Emotion Score is used, which in this case is card 2-1. Next, with reference to FIG. 13C, the New Emotion Score of Node 2 is calculated by reading the player input of 0.0 and multiplying it by the Anger Exit Multiplier of 2.0 (the anger multiplier is used since the player character is in anger "state" at the moment), which gives you a value of 0.0. Then, the Exit Additive Modifier of 0.0 is added for an Adjusted Player Input of 0.0. This is then applied to the Previous Emotion Score of 5.0 providing a new Emotion Score of 5.0. Thereafter, looking at FIG. 11B, it is noted if any subsequent card in column 3 has an emotion score of 5.0. None do. Therefore, the dialog card having a value next lowest to the New Emotion Score is used, which in this case is card 3-2.

Then, with reference to FIG. 13D, the New Emotion Score of Node 3 is calculated by reading the player input of –1.0 and multiplying it by the Placate Exit Multiplier of 4.0 (the placate multiplier is now used since the player placated with joystick 10), which gives you a value of –4.0. Then, the Exit Additive Modifier of 3.0 is added for an Adjusted Player Input of –1.0. This is then applied to the Previous Emotion Score of 5.0 providing a new Emotion Score of 4.0. Thereafter, looking at FIG. 11B, it is noted if any subsequent card in column 4 has an emotion score of 4.0. None do. Therefore, the dialog card having a value next lowest to the New Emotion Score is used, which in this case is card 4-4.

Then, with reference to FIG. 13E, the New Emotion Score of Node 4 is calculated by reading the player input of –2.0 and multiplying it by the Placate Exit Multiplier of 2.0, which gives you a value of –4.0. Then, the Exit Additive Modifier of 1.0 is added for an Adjusted Player Input of –3.0. This is then applied to the Previous Emotion Score of 4.0 providing a new Emotion Score of 1.0. Thereafter, looking at FIG. 11B, it is noted if any subsequent card in column 5 has an emotion score of 1.0. None do. Therefore, the dialog card having a value next lowest to the New Emotion Score is used, which in this case is card 5-3.

Then, with reference to FIG. 13F, the New Emotion Score of Node 5 is calculated by reading the player input of –2.0 and multiplying it by the Placate Exit Multiplier of 2.0, which gives you a value of –4.0. Then, the Exit Additive Modifier of 2.0 is added for an Adjusted Player Input of –2.0. This is then applied to the Previous Emotion Score of 1.0 providing a new Emotion Score of –1.0. Thereafter, looking at FIG. 11C, it is noted if any subsequent card in column 6 has an emotion score of –1.0. None do. Therefore, the dialog card having a value next lowest than the New Emotion Score is used, which in this case is card 6-3.

Next, with reference to FIG. 13G, the New Emotion Score of Node 6 is calculated by reading the player input of 0.0 and multiplying it by either the Placate or Anger Exit Multiplier of 3.0 and 2.0, respectively, (it makes no difference since you are multiplying by 0.0), which gives you a value of 0.0. Then, the Exit Additive Modifier of 2.0 is added for an Adjusted Player Input of 2.0. This is then applied to the Previous Emotion Score of –1.0 providing a new Emotion Score of 1.0. Thereafter, looking at FIG. 11C, it is noted if any subsequent card in column 7 has an emotion score of 1.0. None do. Therefore, the dialog card having a value next lowest to the New Emotion Score is used, which in this case is card 7-3.

Next, with reference to FIG. 13H, the New Emotion Score of Node 7 is calculated by reading the player input of 2.0 and multiplying it by Anger Exit Multiplier of 1.0, which gives you a value of 2.0. Then, the Exit Additive Modifier of 0.0 is added for an Adjusted Player Input of 2.0. This is then applied to the Previous Emotion Score of 1.0 providing a new Emotion Score of 3.0. Thereafter, looking at FIG. 11C, it is noted if any subsequent card in column 8 has an emotion score of 3.0. None do. Therefore, the dialog card having a value next lowest to the New Emotion Score is used, which in this case is card 8-2. This is an end point to the conversation of this dialog sequence. However, the player input can be read in the same manner such that with reference to FIG. 13I, the New Emotion Score of Node 8 is calculated by reading the player input of 0.0 and multiplying it either the Anger or Placate Exit Multiplier, which will give you a value of 0.0. Then, the Exit Additive Modifier of 0.0 is added for an Adjusted Player Input of 0.0. This is then applied to the Previous Emotion Score of 3.0 providing a new Emotion Score of 3.0. It should be noted that in this example the dialog card with the next lowest value to the New Emotion Score was used each time. However, if in the subsequent column any of the cards had the exact score, that card with said exact score would have been used to continue the dialog. The next lowest card is only used when no card has a value equal to the New Emotion Score.

In alternate embodiments of the present invention, the actual graphical representation of the game player's game character (the avatar) can be programmed to change his physical stance based upon the inputted emotional value (a so called "body language component"). For instance, if a low level of anger (i.e., aggravation) is inputted by the computing input device, the actual physical stance of the avatar on the display screen can be shown to pause when hears the answer that aggravates him, shift his body weight, quickly look to the side as he shakes his head in disagreement and takes a deep breath ors clear his throat before the audible response is given by the avatar. Or if a medium level of anger is inputted, the avatar can be shown to shift his body weight but towards the character that he is talking to, while his body tenses (such as his fists clenching) and his face shows an obvious state of agitation. Or, if an extreme level of anger is inputted, the avatar can tense up, grab for a weapon or another means of destructive force (i.e., summon a magical spell) or actually grab the other character and physically assault, hurt or kill him. The same can be true for placation, but wherein the typical body traits and actions associated with such emotion are imputed into the avatar's stance (i.e., dropping the shoulders, whining and slightly backing away from the other character, as one example of a multitude of placating stances.

Equivalent elements and steps of the method can be substituted for ones set forth herein to achieve the same results in the same way and in the same manner.

The invention claimed is:

1. A method for controlling character dialog in a video game displayed in a video game space, the steps of the method comprising:
   a) providing at least two game characters within said video game,
   b) displaying said at least two game characters in said video game space,
   c) permitting said at least two game characters in said video game space to interact in at least one dialog encounter,
   d) permitting a game player of said video game to control attributes of one of said at least two game characters,
   e) providing a computing input device in communication with said video game space, and
   f) activating said computing input device by said game player to control at least two opposing emotions of said one of said at least two game characters for affecting a sequence of character dialog events that occur between said at least two game characters during said at least one dialog encounter, the step of activating the computing input device by said game player triggering forward momentum of one of a plurality of single pass-through dialog sequences for said at least one dialog encounter, wherein each one of said plurality of single pass-through dialog sequences reaches at least one end point of said at least one dialog encounter by a different pathway, said sequence of character dialog events comprising a multiplicity of individual character dialog interactions, said step of activating said computing device to control said at least two opposing emotions occurring at each of said multiplicity of individual character dialog interactions of said at least one dialog encounter between said at least two game characters.

2. The method of claim 1, wherein said video game space is chosen from the group consisting of a gaming console and display screen, a personal computer, a hand held computing device, a laptop computer and a tablet computing device.

3. The method of claim 2, wherein said video game is executable within said video game space.

4. The method of claim 3, wherein said video game is executable within said video game space over a computing network chosen from the group consisting of a local area network, a wide area network or a world-wide system of interconnected networks.

5. The method of claim 1, wherein the step of displaying said at least two game characters in said video game space comprises the step of providing a display screen in communication with a computing device having a computer-readable medium, said computer-readable medium having computer-executable instructions for activating said video game.

6. The method of claim 1, wherein said computing input device is chosen from the group consisting of a gaming console controller, a computer keyboard, a computer mouse, a voice-activated response device, a heat or pressure sensitive control mechanism, a natural user interface and a 3-D body reactive imaging mechanism.

7. The method of claim 6, wherein said computing input device is a gaming console controller having at least one joystick moveable along at least one axis in a forward and backward direction.

8. The method of claim 7, wherein said at least two opposing emotions include anger and placation, said anger emotion inputted into said character dialog of said one of said at least two game characters by said game player by applying pressure in either said forward or said backward direction on said joystick, and said placation emotion inputted into said character dialog of said one of said at least two game characters by said game player by applying pressure on said joystick in said opposing direction to that of said anger emotion.

9. The method of claim 1, wherein said two opposing emotions include anger and placation.

10. The method of claim 1, wherein said step of activating said computing input device by said game player comprises the step of applying pressure on a mechanical device of said computing input device on at least a single axis of said mechanical device.

11. The method of claim 1, wherein each of said multiplicity of individual character dialog interactions has varying exit emotional multiplier values and exit additive modifier values, which are used to calculate an emotional score value in combination with a value attributed to said at least two opposing emotions activated by said game player with said computing input device, which controls said forward momentum of said one of a plurality of single pass-through dialog sequences from one of said multiplicity of individual character dialog interactions to a subsequent one of said multiplicity of individual character dialog interactions until said at least one end point is reached.

12. A computer-readable storage medium having embodied thereon a video game program, said video game program executable by a computing device for performing steps of a method for controlling character dialog in said video game displayed in a video game space, the steps comprising:

a) providing at least two game characters within said video game, b) displaying said at least two game characters in said video game space, c) permitting said at least two game characters in said video game space to interact in at least one dialog encounter, d) permitting a game player of said video game to control attributes of one of said at least two game characters, e) providing a computing input device in communication with said video game space, and f) activating said computing input device by said game player to control at least two opposing emotions of said one of said at least two game characters for affecting a sequence of character dialog events that occur between said at least two game characters during said at least one dialog encounter, the step of activating the computing input device by said game player triggering forward momentum of one of a plurality of single pass-through dialog sequences for said at least one dialog encounter, wherein each one of said plurality of single pass-through dialog sequences reaches at least one end point of said at least one dialog encounter by a different pathway, said sequence of character dialog events comprising a multiplicity of individual character dialog interactions, said step of activating said computing device to control said at least two opposing emotions occurring at each of said multiplicity of individual character dialog interactions of said at least one dialog encounter between said at least two game characters.

13. The computer-readable storage medium of claim 12, located within a computing device chosen from the group consisting of a gaming console, a personal computer, a hand held personal computing device, a laptop computer and a tablet computer.

14. The computer-readable storage medium of claim 12, wherein said computing input device is chosen from the group consisting of a gaming console controller, a computer keyboard, a computer mouse, a voice-activated response device, a heat or pressure sensitive control mechanism, a natural user interface and a 3-D body reactive imaging mechanism.

15. The computer-readable storage medium of claim 12, wherein said two opposing emotions include anger and placation.

16. The computer-readable storage medium of claim 12, wherein said computing input device is a gaming console controller having a mechanical joystick moveable along at least a single axis in a forward and backward direction.

17. The computer-readable storage medium of claim 16, wherein said at least two opposing emotions include anger and placation, said anger emotion inputted into said character dialog of said one of said at least two game characters by said game player by applying pressure in either said forward or said backward direction on said joystick, and said placation emotion inputted into said character dialog of said one of said at least two game characters by said game player by applying pressure on said joystick in an opposing direction to that of said anger emotion.

18. The computer-readable storage medium of claim 12, wherein each of said multiplicity of individual character dialog interactions has varying exit emotional multiplier values and exit additive modifier values, which are used to calculate an emotional score value in combination with a value attributed to said at least two opposing emotions activated by said game player with said computing input device, which controls said forward momentum of said one of a plurality of single pass-through dialog sequences from one of said multiplicity of individual character dialog interactions to a subsequent one of said multiplicity of individual character dialog interactions until said at least one end point is reached.

* * * * *